US005420856A

United States Patent [19]

Kerns

[11] Patent Number: 5,420,856

[45] Date of Patent: May 30, 1995

[54] HIGH-SPEED MULTI-MEDIA SWITCHING SYSTEM

[75] Inventor: Robert Q. Kerns, Blanchester, Ohio

[73] Assignee: Multimedia Design, Inc., Blanchester, Ohio

[21] Appl. No.: 190,251

[22] Filed: Jan. 31, 1994

Related U.S. Application Data

[63] Continuation of Ser. No. 716,954, Jun. 18, 1991, abandoned.

[51] Int. Cl.[6] .......... H04Q 11/04

[52] U.S. Cl. .......... 370/58.1; 370/84; 370/110.1

[58] Field of Search .......... 370/58.1, 60, 94.1, 370/79, 110.1; 358/140, 181, 183; 379/270, 271; 340/826; 371/15.1

[56] References Cited

U.S. PATENT DOCUMENTS

| | | | |
|---|---|---|---|
| 3,833,889 | 9/1974 | Cray | 395/800 |
| 4,301,475 | 11/1981 | McCoy | 358/183 |
| 4,353,091 | 10/1982 | Hoppe | 358/139 |
| 4,532,547 | 7/1985 | Bennett | 358/181 |
| 4,670,786 | 6/1987 | Ricciardi | 358/149 |
| 4,712,239 | 12/1987 | Frezza et al. | 380/20 |
| 4,723,240 | 2/1988 | Fioretto et al. | 370/100 |
| 4,740,963 | 4/1988 | Eckley | 370/84 |
| 4,791,677 | 12/1988 | Mori et al. | 382/41 |
| 4,794,626 | 12/1988 | Tanabe et al. | 375/110 |
| 4,821,034 | 4/1989 | Anderson et al. | 379/271 |
| 4,831,446 | 12/1989 | Nakajima et al. | 358/181 |
| 4,835,613 | 5/1989 | Johnson | 358/181 |
| 4,994,912 | 2/1991 | Lumelsky et al. | 358/140 |
| 5,113,431 | 5/1992 | Horn | 379/203 |
| 5,134,611 | 7/1992 | Steinka et al. | 370/110.1 |
| 5,175,728 | 12/1992 | Caplan et al. | 370/110.1 |
| 5,206,948 | 4/1993 | DeAngelis et al. | 395/575 |
| 5,243,273 | 9/1993 | McAuliffe et al. | 371/15.1 |

*Primary Examiner*—Douglas W. Olms
*Assistant Examiner*—Shick Hom
*Attorney, Agent, or Firm*—Frost & Jacobs

[57] ABSTRACT

A high-speed multi-media switching system is disclosed having a single control system for controlling the operation of switches of both analog signals and digital signals. The switching system contains security verification circuitry which allows only certain input signals to be switched into each output signal. The switching system also has the capability of simultaneous switching of multiple input signals to multiple output signals by pre-loading trigger event commands, which will force the actuation of the simultaneous switching upon the occurrence of certain predetermined triggering events. The switching system also has the capability of communicating with at least one other similar switching system, and for having triggering events in one switching system force the actuation of both analog and digital switches in the other similar system.

44 Claims, 11 Drawing Sheets

HIGH-SPEED MULTI-MEDIA SWITCHING SYSTEM

This a continuation of application Ser. No. 07/716,954, filed Jun. 18, 1991, now abandoned.

TECHNICAL FIELD

The present invention relates generally to electronic switches and is particularly directed to a novel high-speed multi-media switch which can switch both analog signals and digital signals, yet is controlled by a common control system. The invention will be specifically disclosed in connection with a trigger selection controller which can stack up a series of switching commands that will be carried out sequentially only upon the occurrence of the proper, predetermined triggering events.

BACKGROUND OF THE INVENTION

High-speed switching systems have been available in various forms in the prior art. Such systems have been used to input several digital signals, for example, then based on user commands or configurations, the given input signals are switched to given outputs, thus creating different digital output signals. Such digital switching systems require a control system to regulate the timing of switching and to regulate which outputs are connected to which inputs.

High-speed analog switching systems have also been produced in the prior art. Such analog switching systems are often used to connect video input signals to the appropriate analog output, thus producing a new video output signal. Such an analog switching system also requires a control system, similar to the digital high-speed switching systems mentioned above. In the case of analog switching systems, the controller must not only regulate which analog inputs are connected to which analog outputs, but also regulate timing and synchronization of the analog signals. It is particularly important to regulate the synchronization of two different video signals which are to be switched to a single output, one video input signal following the other. Without such synchronization, a video monitor which is connected to the video output of the switching system will momentarily exhibit a glitch pattern or noise during the interval between the end of the first video input signal, and the beginning of the time period wherein the second video signal's synchronization pulses are properly handled by the video monitor.

In the prior art, digital switching systems and analog switching systems were always kept separate. In other words, a digital switching system was on a separate rack from any associated analog switching system, which itself was on its own separate rack. Not only were the digital and analog switching systems on separate racks, but each of them also had its own separate control system. The use of one single control system to control both analog switching systems and digital switching systems has not been achieved in the prior art.

SUMMARY OF THE INVENTION

Accordingly, it is a primary object of the present invention to provide a high-speed multi-media switching system which can switch both digital and analog signals, and is which controlled by a single overall control system.

It is another object of the present invention to provide a high-speed multi-media switching system which has the capability of switching more than one video input signal, including video input signals which have independent synchronization from one another.

It is a further object of the present invention to provide a high-speed multi-media switching system which has the capability of switching both analog and digital signals based upon a predetermined sequence of user commands, by use of switching criteria which determine a sequence of predetermined triggering events.

It is yet another object of the present invention to provide a high-speed multi-media switching system which can divide incoming data streams into individual segments, then reassemble the individual segments into new data streams for outputting to further devices.

It is a yet further object of the present invention to provide a high-speed multi-media switching system which can take multiple incoming data streams and assemble them into one data stream which is sent as an output to a matching high-speed multi-media switching system. The matching switching system then divides the incoming data stream into individual segments, and then reassembles the individual segments into the original data streams that were received by the first switching system.

It is a yet further object of the present invention to provide a high-speed multi-media switching system which performs security verification and logging functions.

Additional objects, advantages and other novel features of the invention will be set forth in the description that follows, and others will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a high-speed multi-media switching system is provided which accepts analog and digital electrical signals as inputs, then routes those analog and digital signals through a set of switching networks which are controlled by a main control module, by which the properly selected analog and digital input signals are sent to various output devices wherein the proper analog and digital signals can be output to other devices.

In accordance with another aspect of the invention, the present high-speed multi-media switching system contains the necessary input/output devices to communicate with external analog and digital electrical signals.

In accordance with yet another aspect of the invention, the high-speed multi-media switching system contains both analog and digital switching modules, which switch the appropriate analog and digital input signals according to commands given by the system control module.

In accordance with a further aspect of the invention, the high-speed multi-media switching system includes a video synchronization trigger module which allows glitchless switching between two video signals having independent video synchronization.

In accordance with yet a further aspect of the invention, the high-speed multi-media switching system includes a common switching module control interface which consists of means for selecting individual analog and digital switching modules within the high-speed multi-media switching system. The common switching module control interface also includes means for selecting individual communication ports within any given analog or digital switching module, and includes means for selecting individual security and control options within any given port.

In another aspect of the present invention, a high-speed multi-media switching system is provided with a trigger selection controller that has means for independent control and selection of many triggers per output port, and also has means for providing positive read back of the selected trigger selection set up, according to a predetermined sequence of user commands.

In a further aspect of the invention, a high-speed multi-media switching system is provided with a time slot switching module that can divide an incoming data stream into individual segments, store the individual segments in temporary memory locations, then reassemble the individual segments according to a predetermined user command into new data streams for output.

According to yet another aspect of the present invention, a high-speed multi-media switching system is provided with analog input/output modules and analog switching modules which are capable of handling analog signals having bandwidths of up to 1000 MHz.

In yet a further aspect of the invention, a high-speed multi-media switching system is provided with digital input/output modules an digital switching modules which are capable of handling data rates up to 3500 million bits per second.

In accordance with yet another aspect of the invention, the high-speed multi-media switching system control module can interlock and synchronize with other redundant system control modules. Under predetermined software control, the first (primary) control module can regulate certain analog and digital input/output modules, regulate certain analog and digital switching modules, and perform certain security verification and logging functions. A second (alternate) control module, again under predetermined software control, can also regulate the operation of other analog and digital input/output modules, regulate other analog and digital switching modules, and perform other security verification and logging functions. Added to the fact that each system control module can control one group or a second group of analog and digital input/output modules and switching modules, under predetermined software control, one such system control module can, in an emergency, take over the necessary control functions of a second redundant control module.

In accordance with a yet further aspect of the invention, the provided high-speed multi-media switching system control module can control not only the various input/output modules and switching modules contained within its own chassis, but can also communicate with and control similar input/output modules and switching modules which are mounted on separate chassis. The other chassis can be mounted locally, in which the necessary trigger lines and control lines can be hard wired between the two or more chassis. On the other hand, other chassis can be remotely located (e.g., even in another city) by connecting the necessary trigger and control lines into local digital input ports and output ports. High-speed communication links can be used to connect the system's own input/output ports, having the necessary trigger and control signals, to transmit and receive such signals, thus allowing two or more remotely located chassis to work in cooperation with one another. In a system such as described above, each chassis has its own primary control module, which works in communication with the other chassis' control module.

In yet another aspect of the invention, the operation of the analog and digital crosspoint switches are controlled by predetermined trigger events. The predetermined trigger events are utilized to determine at what time the analog and digital crosspoint switches are actuated (either opened or closed). The switching module(s) determine which crosspoint switches will be actuated upon the occurrence of the correct trigger events by loading and stacking-up a special group of trigger address registers with trigger event commands. The trigger event commands will be activated upon the sequential occurrence of the predetermined trigger events. The Trigger Selection Controller determines the sequence of events wherein predetermined inputs are electrically connected to predetermined outputs upon the occurrence of the predetermined trigger events. Each output, whether analog or digital, can have several trigger event commands which determine the particular input which is to be connected to that output at any given moment, depending upon whether the predetermined triggering events have occurred.

In a yet further aspect of the invention, multiple incoming data streams can be received by a first high-speed multi-media switching system, assembled into one reassembled data stream, and then output to a second high-speed multi-media switching system. The second switching system can input this reassembled data stream, send the data stream to a time slot switching module which will divide the data stream into individual segments, and then reassemble the individual segments into multiple data streams that are identical to those multiple data streams that were received by the first switching system. The second switching system can then output the multiple data streams. In this manner, the two high-speed multi-media switching systems can act as a Multiplexor-Demultiplexor system.

Still other objects of the present invention will become apparent to those skilled in the art from the following description wherein there is shown and described a preferred embodiment of this invention, simply by way of illustration, of one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Reference will now be made in detail to the present preferred embodiment of the invention, an example of which is illustrated in the accompanying drawings, wherein like numerals indicate the same elements throughout the views.

Figure 1:
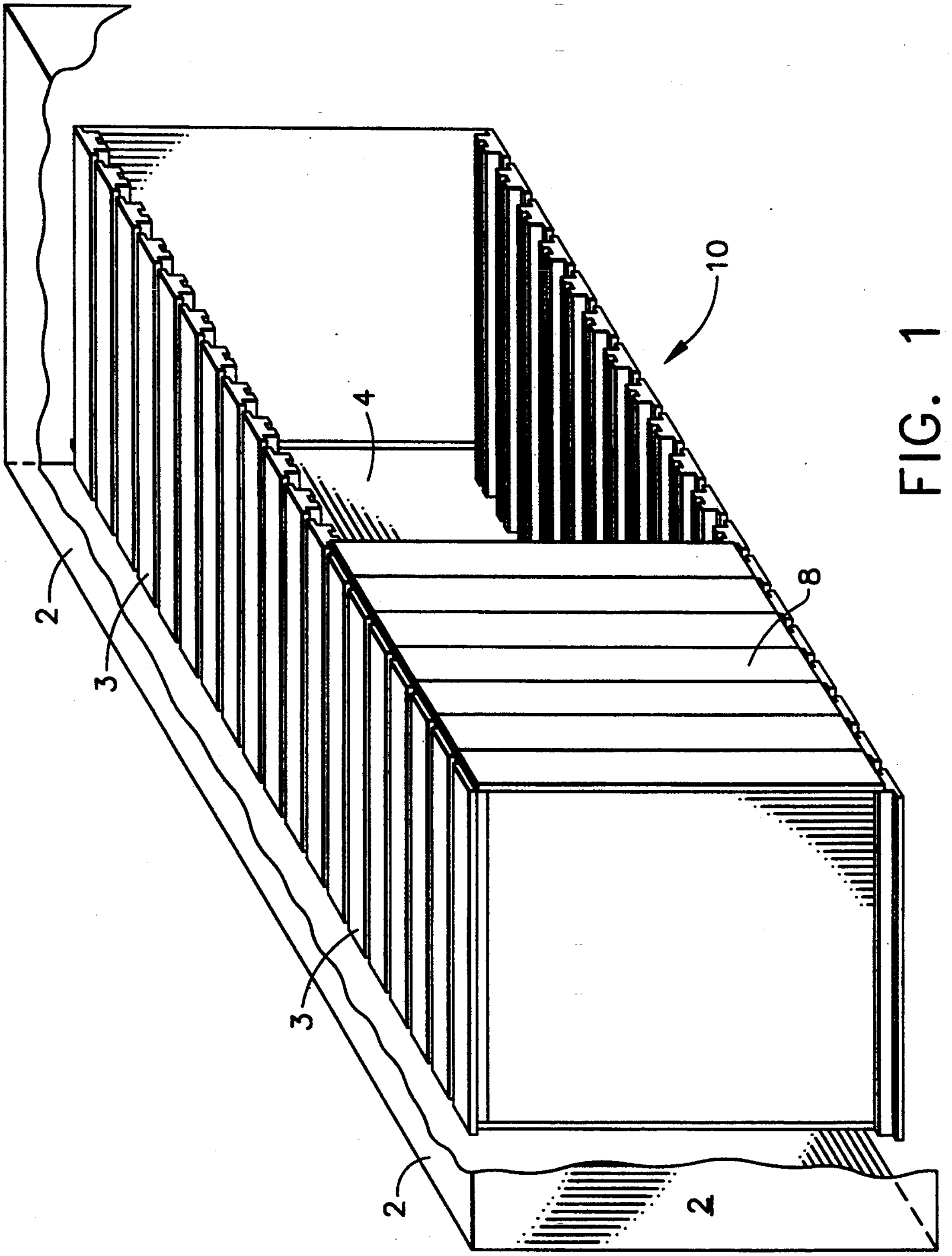
FIG. 1 is a partially cut-away perspective view of a high-speed multi-media switching system chassis, which contains various input/output and switching modules.

The Multi-media switch or system 10 as depicted in FIG. 1 is an information switching and management system which has been designed to allow common control of a wide range of signal types over a range of geographical areas. A few examples of signal types contemplated are:

Analog Audio signals
Analog Video signals
Analog Telemetry signals
Digital Audio signals
Digital Video signals
Digital Telemetry signals
Digital Telecommunications signals Some examples of geographic areas are:

Within the same room,
Within the same building,
Within the same town,
Within the same state, and
Within the same Country.

One of the major advantages of the present system is the distributed common control system which manages the following signal attributes while the signal is under the control of the multi-media switch:

Signal source and destinations, and
Signal transformations

For example, the multi-media control allows a signal to enter the system as an analog signal, traverse the system as an analog or digital signal, and be output in the form (analog or digital) which is appropriate for the destination. Signal conversion is not mandatory, but is available as a customer chosen option. For reasons of practicality and economics, most signals traveling short distances will stay in their original form, but signals which must travel long distances might preferably be converted into a digital form, since long haul digital transmission is currently less expensive than long haul analog transmission.

The major components of a multi-media switching system 10 are illustrated in FIG. 1. The system 10 consists of a chassis 3, a backplane 4, and various plug-in modules which make up a mainframe 8. The entire chassis 3 will sit inside an electromagnetically shielded enclosure 2 in a preferred embodiment.

Figure 2:
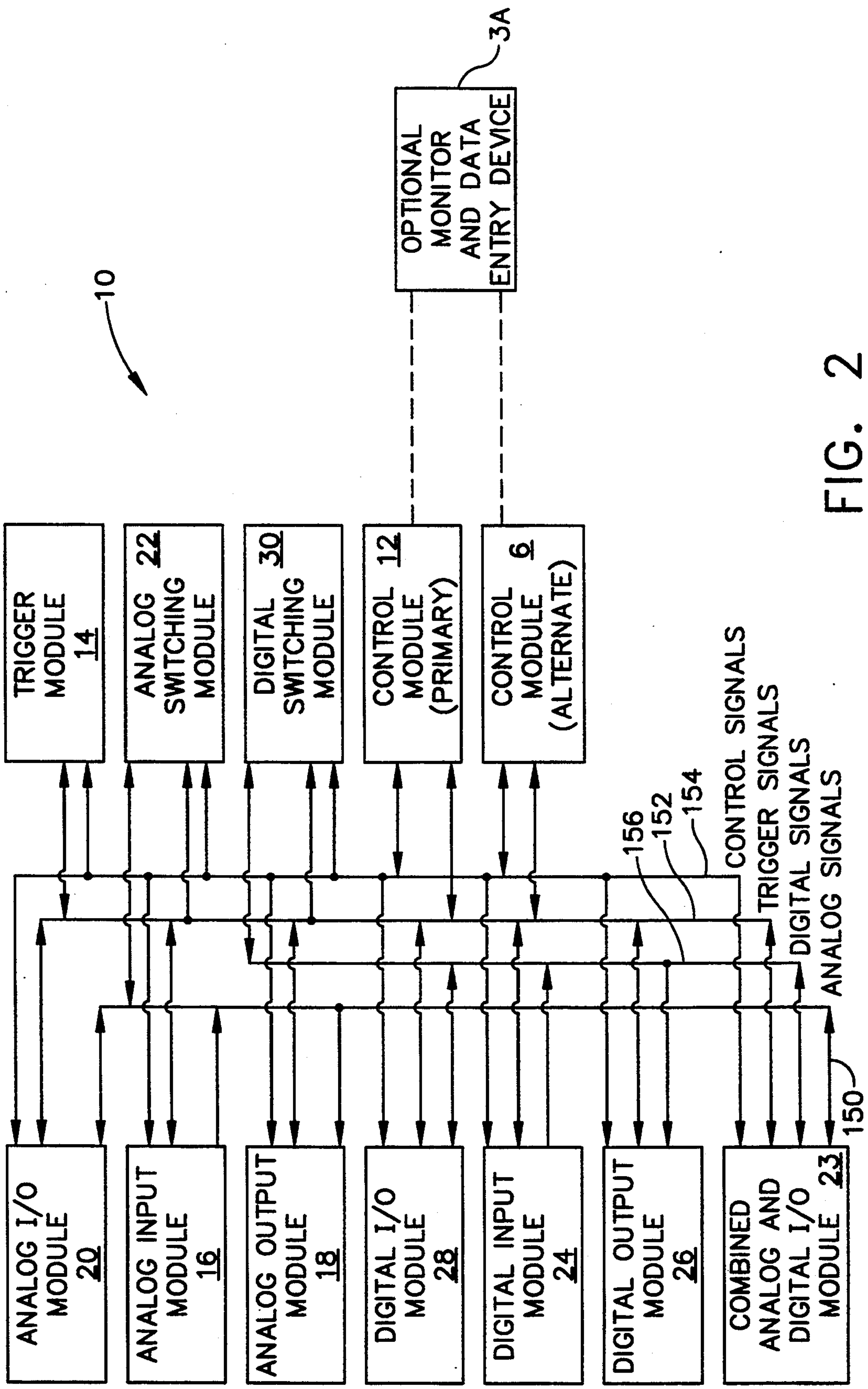
FIG. 2 is a block diagram of the overall multi-media switching system, showing the necessary signals which run between the modules, and showing a variety of analog and digital modules which can be connected into the system.

The function of multi-media control system 10 is to provide a means to control and switch information in multiple forms simultaneously. The primary subsystems within the multi-media switch 10 as depicted in FIG. 2 are as follows:

Monitor and Keyboard 3A optional
Primary Control Module 12.
Backup Control Module 6.
Trigger Modules 14.
Digital Switching Modules 30.
Analog Switching Modules 22.
Digital I/O Modules 24, 26, and 28.
Analog I/O Modules 16, 18, and 20.
Combined Analog and Digital I/O Module 23.

The system 10 comprises the following equipment:

(1) Chassis 3 which houses the system.
(2) Fans to provide cooling for the system.
(3) EMI shielding 2 for the system.
(4) Power supply modules which provide appropriate voltages and current to correctly operate the system modules.
(5) Backplane 4 which carries power and signals between modules within the system. A preferred example of a backplane which carries the necessary high-speed signals is disclosed in a copending U.S. patent application Ser. No. 07/717,341, filed concurrently, herewith, such copending application being herein incorporated by reference. The backplane 4 carries a very large number of various signals. The signals are grouped by type into "buses". The backplane of the preferred embodiment carries the following numbers of signals to every plug-in slot location:
   Analog Distribution Bus: 80 Analog lines.
   Digital Distribution Bus: 128 Digital lines.
   Trigger Distribution Bus: 64 Trigger lines.
   System Control Bus: 48 Control lines Note that one overall control system can have several chassis (e.g., 3) connected together to make up larger switching arrays.

The primary control module 12 performs the following functions:

(1) Overall system control.
(2) Constant checking with Alternative Control Module 6 to ensure continued correct operation of the control system.
(3) Constant checking of all Trigger, I/O, and Switching Modules to ensure that no internal errors have been detected.
(4) Constant checking of all control inputs to see if user commands have arrived for processing.
(5) Constant checking with the time of day clock to see if any preprogrammed event must take place.

Trigger modules 14 within the multi-media switch perform the following functions:

(1) Accept input from one or more signal inputs (2) Wait for commands from the control system defining which trigger signal should be generated, and what conditions must be fulfilled for the signal to be generated.

(3) Wait until the correct set of conditions have occurred and generate the correct trigger pulse or pulses.

The Analog Input Modules 16 perform the following functions:

(1) Accept commands from the control modules regarding application-specific signal conditioning to be performed.

(2) Accept input from an external signal source (3) Perform any application specific signal conditioning, such as optional conversion to an application specific Digital Signal Format.

(4) Present the signal or signals to the analog (and optionally the digital) distribution signal lines of the backplane to all modules which require the signals for correct operation.

The Analog Output Modules 18 perform the following functions:

(1) Accept commands from the control modules regarding application-specific signal conditioning to be performed before the signal is output from the switch.

(2) Accept the signal or signals from the analog (and optionally the digital) distribution signal lines of the backplane from all modules which are to present signals which are used to create the final output signal.

(3) Present output to an external signal destination.

Analog I/O modules 20 perform the functions of both an input and output module as defined above. A module which combines input and output operations are generally used for signals which have a small number of inputs and outputs.

Analog Switching modules 22 perform the following functions within the switch:

(1) Accept commands from the control modules regarding which input signal is to be output to a specific output output.

(2) Accept commands from the control modules regarding which trigger signal(s) should be used to cause the switching event to occur.

(3) When the trigger event occurs, output the specified input signal source(s) to the required output(s).

The Digital Input Modules 24 perform the following functions:

(1) Accept commands from the control modules regarding application-specific signal conditioning to be performed.

(2) Accept input from an external signal source (3) Perform any application-specific signal conditioning, such as level changing (eg. ECL to TTL, TTL to Gas), or optional conversion to an application-specific analog signal format.

(4) Present the signal or signals to the digital (and optionally the analog) distribution signal lines of the backplane to all modules which require the signals for correct operation.

The Digital Output Modules 26 perform the following functions:

(1) Accept commands from the control modules regarding application-specific signal conditioning to be performed before the signal is output from the switch.

(2) Accept the signal or signals from the digital (and optionally the analog) distribution signal lines of the backplane from all modules which are to present signals which are used to create the final output signal.

(3) Perform any application-specific signal conditioning Level Changing, such as, ECL to TTL, TTL to Gas, or optional conversion to an application specific Digital Signal Format.

(4) Present output to an external signal destination.

Digital I/O modules 28 similarly perform the functions of both an input and output module as defined above. A module which combines input and output operations is generally used for signals which have a small number of inputs and outputs.

Digital Switching modules 30 perform the following functions within the switch:

(1) Accept commands from the control modules regarding which input signal is to be output to a specific output output.

(2) Accept commands from the control modules regarding which trigger signal(s) should be used to cause the switching event to occur.

(3) When the trigger event occurs, output the specified input signal source(s) to the required output(s).

Combined Analog and Digital I/O Modules 23 perform input and output functions for both analog and digital signals within a single module. This type of configuration would normally occur only where a small number of such signals were connected to the module.

Digital Time Slot Switching modules 320 (see FIG. 14) perform the following functions within the switch:

(1) Accept commands from the control modules regarding which input signal, and which group of bits within the input signal are to be output to a specific output signal at a specific time and rate.

(2) Accept commands from the control modules regarding which trigger signal(s) should be used to cause the switching event to occur.

(3) When the trigger event occurs, output the specified input signal source(s) to the required output(s).

The Primary control module 12 provides the following functions:

(1) Interlock and synchronization with redundant control modules.

(2) Control of Analog and Digital Switching modules.

(3) Control of Trigger modules.

(4) Control of Analog and Digital I/O modules.

(5) Security verification and logging.

Figure 3:
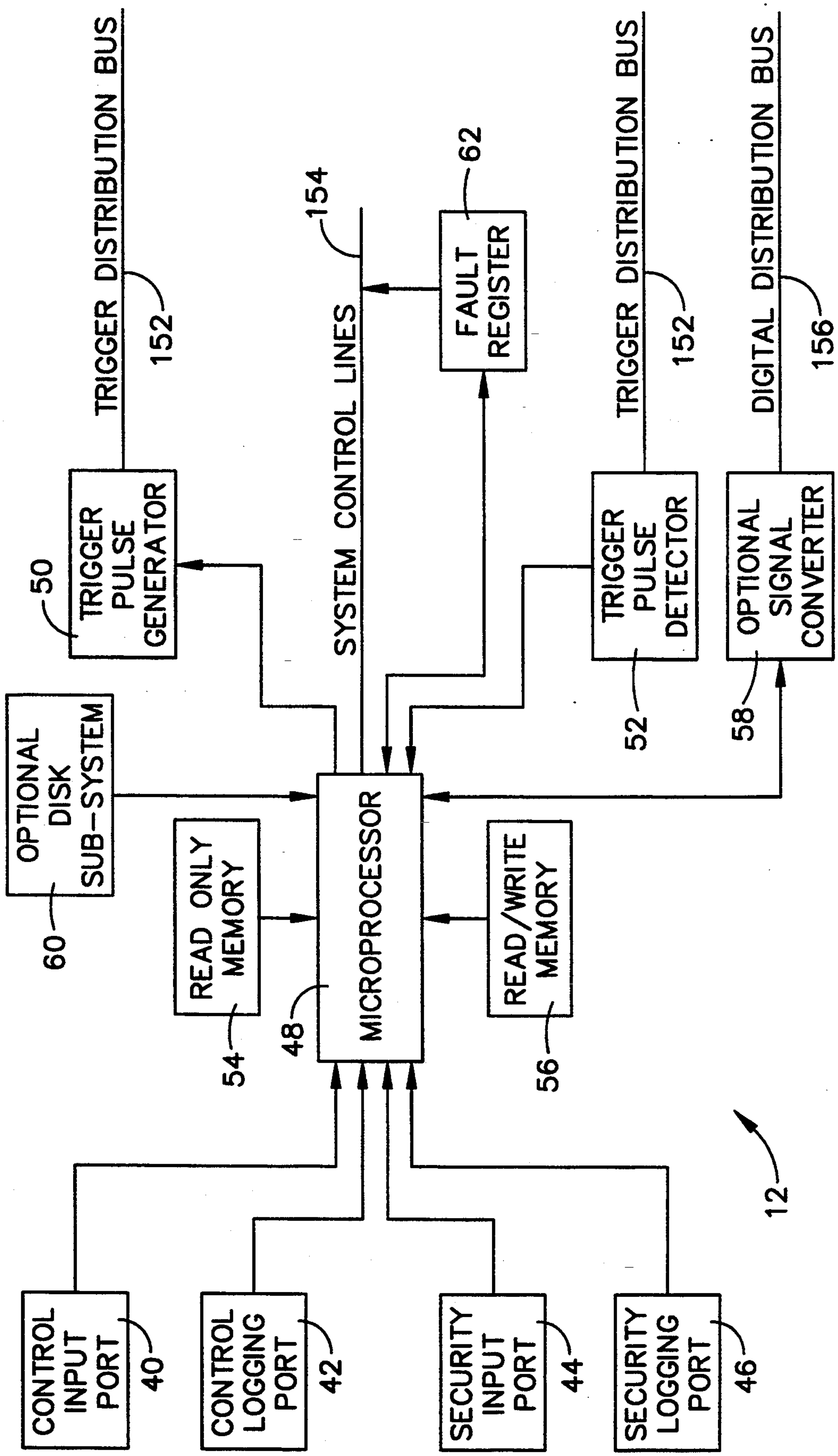
FIG. 3 is a block diagram of the system control module.

The system control module 12 comprises the following items, as depicted in FIG. 3:

The control input port 40 is used to accept incoming commands which cause switching operations to occur.

The control logging port 42 is used to output a detailed status report regarding switching operations.

The security input port 44 is used to establish which combination of operations may occur and under what set of conditions those operations may occur.

The security logging port 46 is used to output a detailed status report regarding security requests, as well as any security information related to switching requests.

The microprocessor 48 forms the operational center of the control system 10. The Read Only Memory 54 supplies the program to start the microprocessor 48 operations, while the Random Access Memory (Read/-write memory) 56 provides memory for use by the microprocessor 48 during operations.

The trigger pulse generator 50 allows the control system to create trigger pulses. These trigger pulses are used by the switching modules to initiate switching operations.

The trigger pulse detector 52 is used by the control system to read the trigger bus and cause actions to occur as required by the program operating in the microprocessor 48.

System Control Module:

The System Control Module 12 functions as follows:

(1) When power is applied to system 10, the microprocessor 48 goes to the Read Only Memory to read the initial diagnostic program which checks the following items:
 (a) Verify contents of Read Only Memory 54.
 (b) Verify correct operation of read/write memory 56.
 (c) If the module 12 is connected to the optional signal converter 58, verify correct operation of such converter.
 (d) If the module 12 is connected to the optional disk subsystem 60, verify correct operation of such disk subsystem.
 (e) Verify correct operation of the Trigger pulse generator 50 and Trigger pulse detector 52.

(2) If all of the initial diagnostic testing is successfully completed, the initial program loader is run by the microprocessor 48. This program performs the following functions:
 (a) Determine which of the following devices contains the operational program:
  Read Only Memory 54.
  Optional disk system 60.
  Optional Signal Converter 58.
 (b) Attempt to load the operational program from the specified load device.
 (c) If the program load is successful, proceed by running the operational program.
 (d) If the program load failed, attempt to load the operational program from one of the other devices.
 (e) If all attempts to load the operational program fail, notify the control, and security logging ports 46.

(3) The operational program performs the following functions:
 (a) Accept input from the security input port 44 regarding the conditions under which inputs may connected to outputs.
 (b) Accept input from the control input port 40 which commands the system to connect an input to one or more outputs. If the requested command is invalid, the control input port 40 is notified, unless the invalid command is a result of a security violation. Under all conditions the control logging port 42 records what requests have been made, and the source of such requests.
 (c) Check the time of day to determine what if any preprogrammed operations should now be executed.
 (d) Check each of the system modules to determine if any faults have occurred since the last check. If any faults did occur, information about the fault is output to the control logging port 42. If the fault is in the security system, the fault is logged on the security logging port 46.
 (e) Check the control module fault register 62 to determine if a control module fault has occurred. If a control module fault has occurred, a check with the alternate control module 6 is made to see if it is functional. If it is functional, the currently active control module 12 ceases functioning, and relinquishes control to the Alternate Control Module 6. If both control modules are faulty, a primary system fault has occurred, and both control modules cease to function after outputting the appropriate message to the control 40 and security logging ports 46.
 (f) If there are no faults in the system, then the Primary Control Module 12 and Alternate Control Module(s) 6 [more than one Alternate Control Module can operate within a single switching system (10)] work to establish a common command input queue. Each control module will then process the next available command. As each command is executed by one of the control modules, that command is removed from the input queue. Each active control module will receive the next command from the input queue as the control module has completed its previous command execution.
 (g) The execution of a command occurs as follows:
  (i) Check to ensure that the requested module is currently in the system and operational.
  (ii) Check to ensure that the requested input(s) and output(s) are active on the module.
  (iii) Check to ensure that the requested trigger module(s) are currently in the system and operational.
  (iv) Check to ensure that request trigger actions are allowed on the selected trigger module.
  (v) If all checks pass the following events occur:
   Load the switch module with the correct command.
   Load the trigger module with the correct command.
   Verify the commands.
   Set the command go bit on the switch module.
   Set the command go bit on the trigger module.
  (vi) When and if the trigger event occurs, the following items will occur:
   The switching event(s) will occur.
   The Control Module 12 will be informed that the event has occurred.
   If the command which has just been executed must trigger another series of events, the trigger detector reports the trigger event to the Control Module 12 which then begins the next set of commands.
 (h) The validation of the redundant (alternate) controllers 6 occurs as follows:
  (i) Check the system configuration to determine if there should be a redundant control module.
  (ii) If there is a redundant controller 6, then send a message to that control module 6, indicating that the Primary Control Module 12 is active and functional.
  (iii) Wait for a reply to the message from the redundant Control Module 6 saying that it, too, is active and functional.

(iv) If there is no reply and the waiting time has passed, issue the restart command to the redundant Control Module 6.

(v) If a correct reply is received from the redundant Control Module 6, then both control modules commence operation in cooperation with one another, both utilizing a common input command queue, and both controlling certain output ports, and certain switching modules.

(i) The Trigger pulse generator 50 on the control module is used as follows:

If the command to be executed does not require any external trigger module, the internal trigger generator is used to create any required trigger pulses.

(j) In order for the switching system 10 to receive new commands, such commands are entered by use of hardware on the control modules 12 and 6. Such hardware is depicted on FIG. 3, elements 40 and 44. Each control module can communicate with a local terminal or local computer through the Control Input Port 40 and the Security Input Port 44. Switching commands are received through the Control Input Port 40, and bit map commands and other security verification commands are received through the Security Input Port 44. An alternate route for receiving commands is through the optional Signal Converter 58. Other local and remote computers, including other multi-media switching systems made in accordance herewith, can communicate with the switching system 10 via the Signal Converter 58. Both switching-type commands and security-type commands can be sent through the Signal Converter 58.

Figure 10:
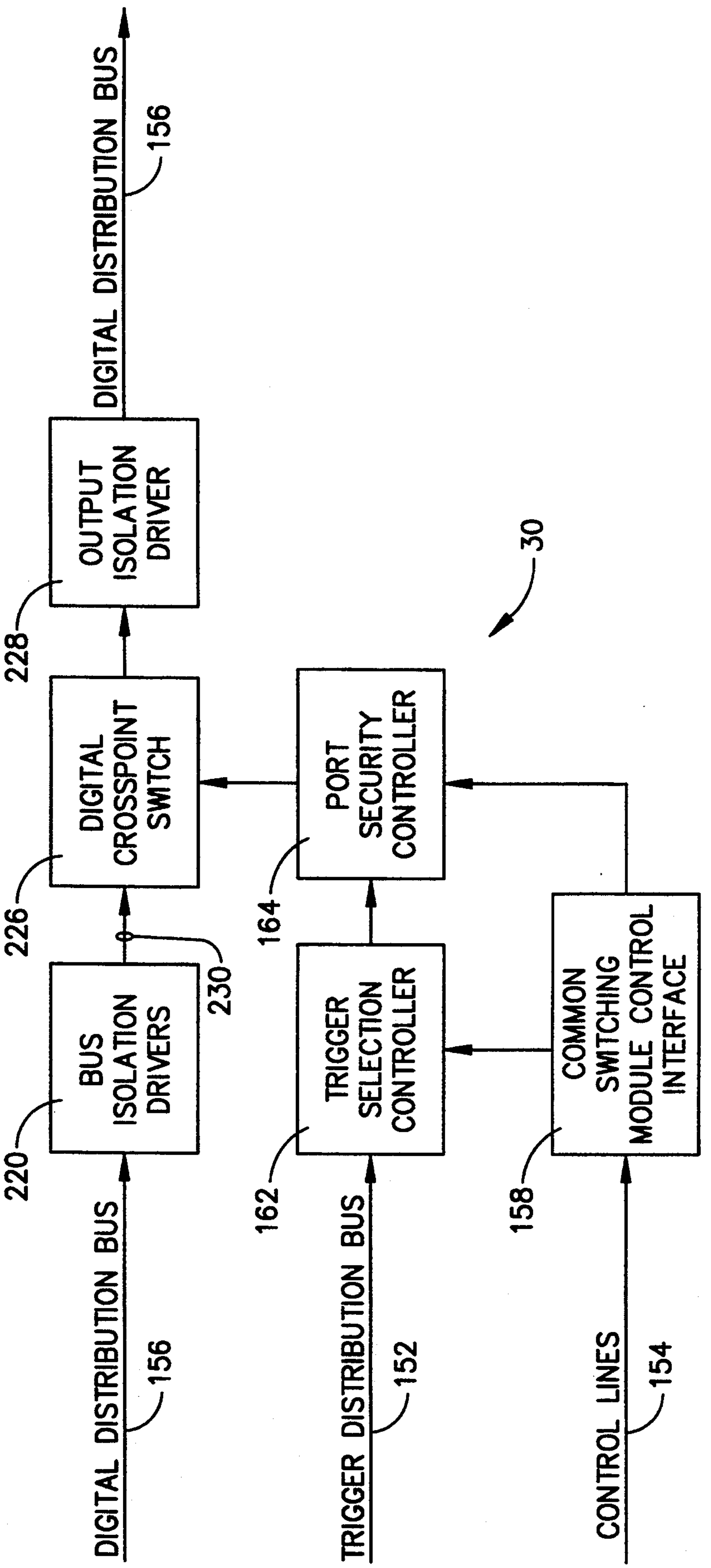
FIG. 10 is a block diagram of a digital switching module.

To facilitate the switching of video signals, various video synchronization trigger modules can be installed into Multi-Media Switching System 10. Examples of these video synchronization trigger modules are as follows:

NTSC Video Synchronization Trigger Module:

The function of the NTSC Video Synchronization Trigger module 70 (see FIG. 4) is to provide the required timing pulses to control the multi-media crosspoint switching arrays 166 (see FIG. 8) and 226 (see FIG. 10). The purpose of the circuit 70 is to provide a means to allow glitchless switching between two video signals with common NTSC synchronization.

Figure 4:
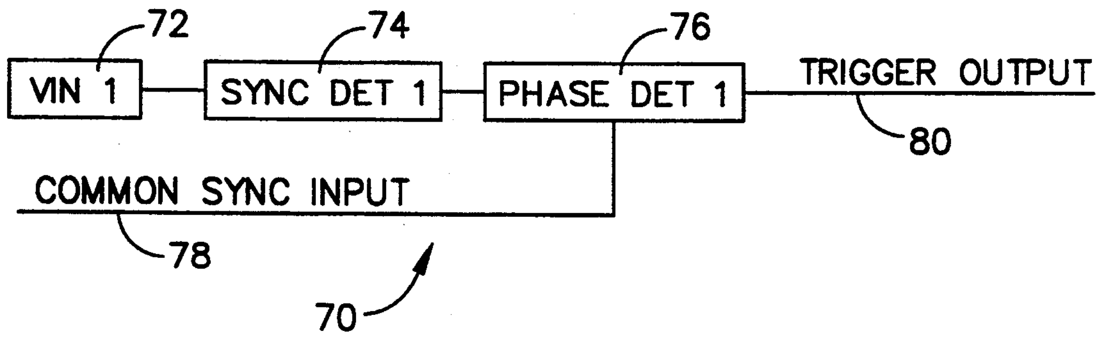
FIG. 4 is a block diagram of a video synchronization module which utilizes the NTSC video standards.

The detailed operation of the module 70 is schematically depicted in FIG. 4, and can be described as follows:

(1) The Video input (VIN 1) 72 is sent to a NTSC synchronization (also called sync) detector 74. This circuit outputs a sync pulse at each horizontal line, each field, and each frame.

(2) The Phase detector 76 is given the sync pulses from VIN 1 72 and the common sync 78. This circuit will output a logic "1" when VIN 1 72 and common sync 78 are locked, and a logic "0" when they are not locked.

(3) The trigger output 80 is used to control actions in the switching modules.

PAL Video Synchronization Trigger Module:

The function of the PAL Video Synchronization Trigger module 82 (see FIG. 5) is to provide the required timing pulses to control the multi-media crosspoint switching arrays 166 and 226. The purpose of the circuit 70 is to provide a means to allow glitchless switching between two video signals with common PAL synchronization.

Figure 5:
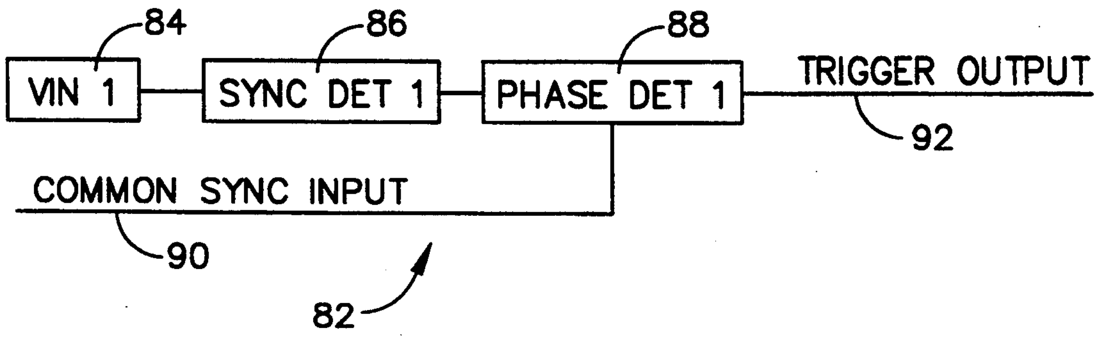
FIG. 5 is a block diagram of a video synchronization module which uses the PAL video format.

The detailed operation of the module 82 is schematically depicted in FIG. 5, and can be described as follows:

(1) The Video input (VIN 1) 84 is sent to a PAL sync detector 86. This circuit outputs a sync pulse at each horizontal line, each field, and each frame.

(2) The Phase detector 88 is given the sync pulses from VIN 1 84 and the common sync 90. This circuit will output a logic "1" when VIN 1 84 and common sync 90 are locked, and a logic "0" when they are not locked.

(3) The trigger output 92 is used to control actions in the switching modules.

SECAM Video Synchronization Trigger Module:

The function of the SECAM Video Synchronization Trigger module 94 is to provide the required timing pulses to control the multi-media crosspoint switching arrays 166 and 226. The purpose of the circuit 70 is to provide a means to allow glitchless switching between two video signals with common SECAM synchronization.

Figure 6:
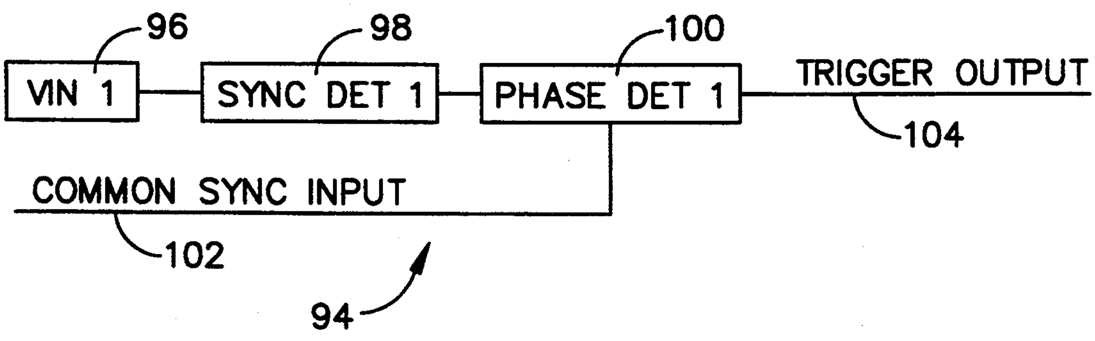
FIG. 6 is a block diagram of a video synchronization module which uses the SECAM video format.

The detailed operation of the module 94 is schematically depicted in FIG. 6, and can be described as follows:

(1) The Video input (VIN 1) 96 is sent to a SECAM sync detector 98. This circuit outputs a sync pulse at each horizontal line, each field, and each frame.

(2) The Phase detector 100 is given the sync pulses from VIN 1 96 and the common sync 102. This circuit will output a logic "1" when VIN 1 96 and common sync 102 are locked, and a logic "0" when they are not locked.

(3) The trigger output 104 is used to control actions in the switching modules.

Dual Video Synchronization Trigger Module:

The function of the Dual Video Synchronization Trigger module 106 is to provide the required timing pulses to control the multi-media switching arrays. The purpose of the circuit is to provide a means to allow glitchless switching between two video signals with independent synchronization.

Figure 7:
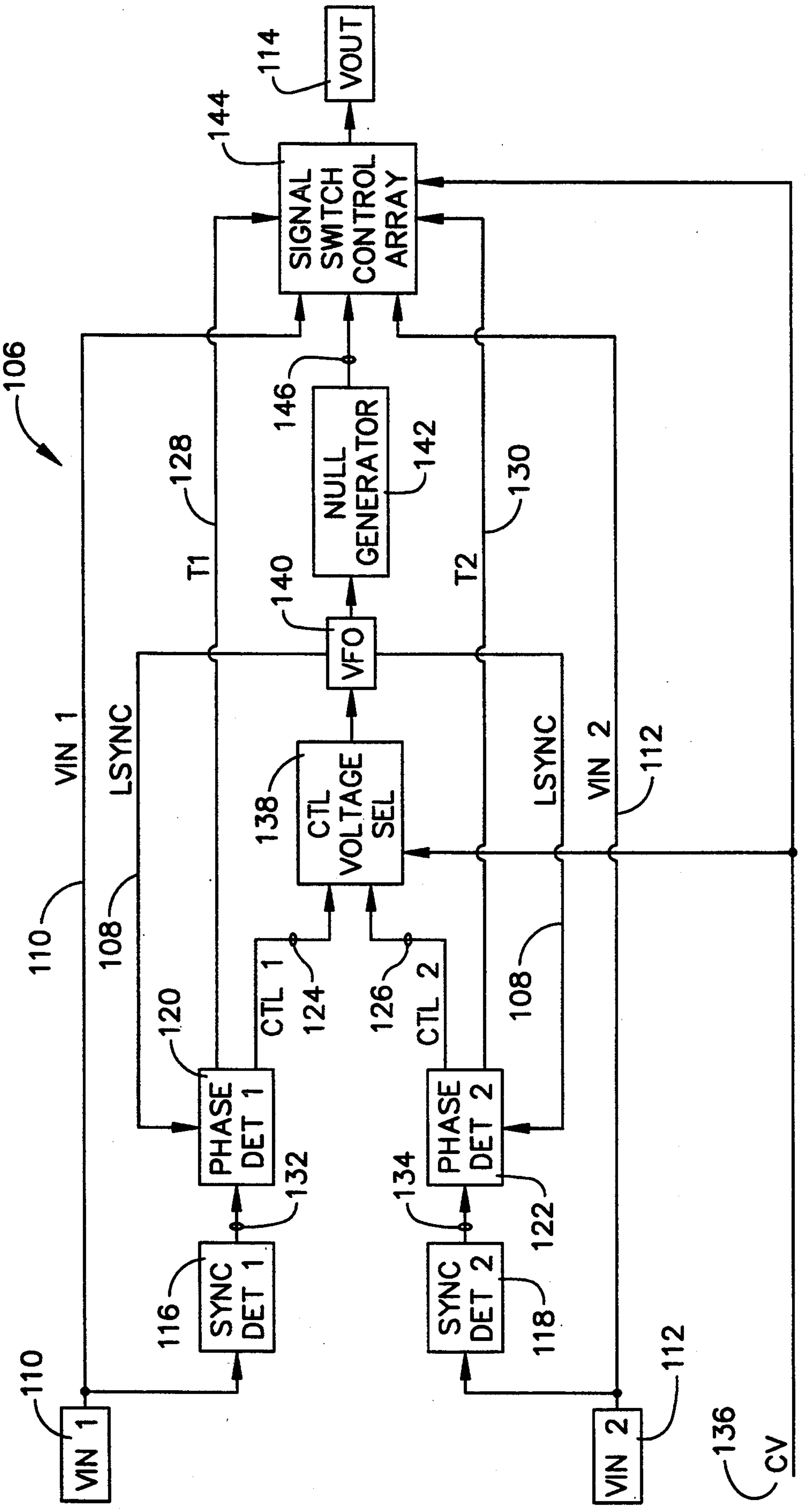
FIG. 7 is a block diagram of a dual video synchronization trigger module, which has the capability of switching from one video input signal to a second video input signal, each having independent synchronization.

The detailed operation of the module 106 is schematically depicted in FIG. 7, and can be described as follows:

The circuit operates as follows:

(1) The signal LSYNC 108 is a Local Sync signal generated by the variable frequency oscillator and used later in this circuit.

(2) The signal VIN 1 110 is passed through the switching array to the output signal VOUT 114.

(3) The signal VIN 1 110 is passed through the sync detector circuit SYNC DET 1 116. This circuit emits a pulse 132 for each vertical interval period found in the VIN 1 110 signal.

(4) The circuit PHASE DET 1 120 is a phase detector circuit which monitors the phase relationship between the signals SYNC 1 132 and LSYNC 108. If the timing of SYNC 1 132 is behind the timing of LSYNC 108, a positive voltage is output on signal CTL 1 124; if the timing of SYNC 1 132 is ahead of the timing of LSYNC 108 a negative voltage is output on signal CTL 1 124. When the phase of SYNC 1 132 and LSYNC 108 match, the signal T1 128 is set to logic 1.

(5) The signal VIN 2 112 is passed through the sync detector circuit SYNC DET 2 118. This circuit emits a pulse 134 for each vertical interval period found in the VIN 2 112 signal.

(6) The circuit PHASE DET 2 122 is a phase detector circuit which monitors the phase relationship between the signals SYNC 2 134 and LSYNC 108. If the timing of SYNC 2 134 is behind the timing of LSYNC 108, a positive voltage is output on signal CTL 2 126; if the timing of SYNC 2 134 is ahead of the timing of LSYNC 108 a negative voltage is output on signal CTL 2 126. When the phase of SYNC 2 134 and LSYNC 108 match, the signal T2 130 is set to logic 1.

(7) Control voltage signal CV 136 is used to decide the timing of a switching event. Under normal circumstances, signal CV 136 is at logic 0. However, CV 136 switches to logic 1 when a switching event is about to occur. The multi-media switch control system decides when to force CV 136 to become a logic 1.

(8) When the signal CV 136 is at logic 0, signal CTL 1 124 is selected by the control voltage selector circuit CTL VOLTAGE SEL 138, and is used to control the variable frequency oscillator 140. At the point in time when the VIN 1 and NULL Generator signals are in phase, the signal T1 128 is passed on to the switching control array 144 to arrange for the signal NULL 146 to be sent as signal VOUT 114.

(9) The NULL Generator 142 generates a standard image. Such standard image can be any predetermined video pattern, however, an all-black signal is typically used. The output of the NULL Generator 142 is called the NULL Signal 146, and contains all appropriated video timing pulses. When transmit control signal T1 128 is set to logic 1, the Signal Switching Control Array 144 outputs the NULL signal 146 instead of the previously output signal VIN 1 110. Note that Signal Switching Control Array 144 is the same item as a digital switching module 30, or an analog switching module 22. Before the NULL Signal 146 becomes the output 114 of the Signal Switching Control Array 144, the NULL Generator 142 is continuously being synchronized with video input signal VIN 1 110. After the NULL signal 146 becomes the output 114 of the Signal Switching Control Array 144, the variable frequency oscillator 140 is controlled to speed up or slow down the NULL Signal's synchronization pulses to match those of video input signal VIN 2 112.

(10) When the signal CV 136 is at logic 1, signal CTL 2 126 is selected by the control voltage selector circuit CTL VOLTAGE SEL 138, and is used to control the variable frequency oscillator 140. At the point in time when the NULL Generator and VIN 2 signals are in phase, the signal T2 130 is passed on to the switching control array 144 to arrange for the signal VIN 2 112 to be sent to VOUT 114. In this manner, a glitchless transition from VIN 1 110 to VIN 2 112 has been achieved, even though VIN 1 110 and VIN 2 112 have independent sync.

Analog Switching Module:

The function of the Analog Switching module 22 is to provide switching of analog signals. The purpose of the circuit is to provide a means to allow independent selection for each output from any of the narrow bandwidth Analog signal inputs.

Figure 8:
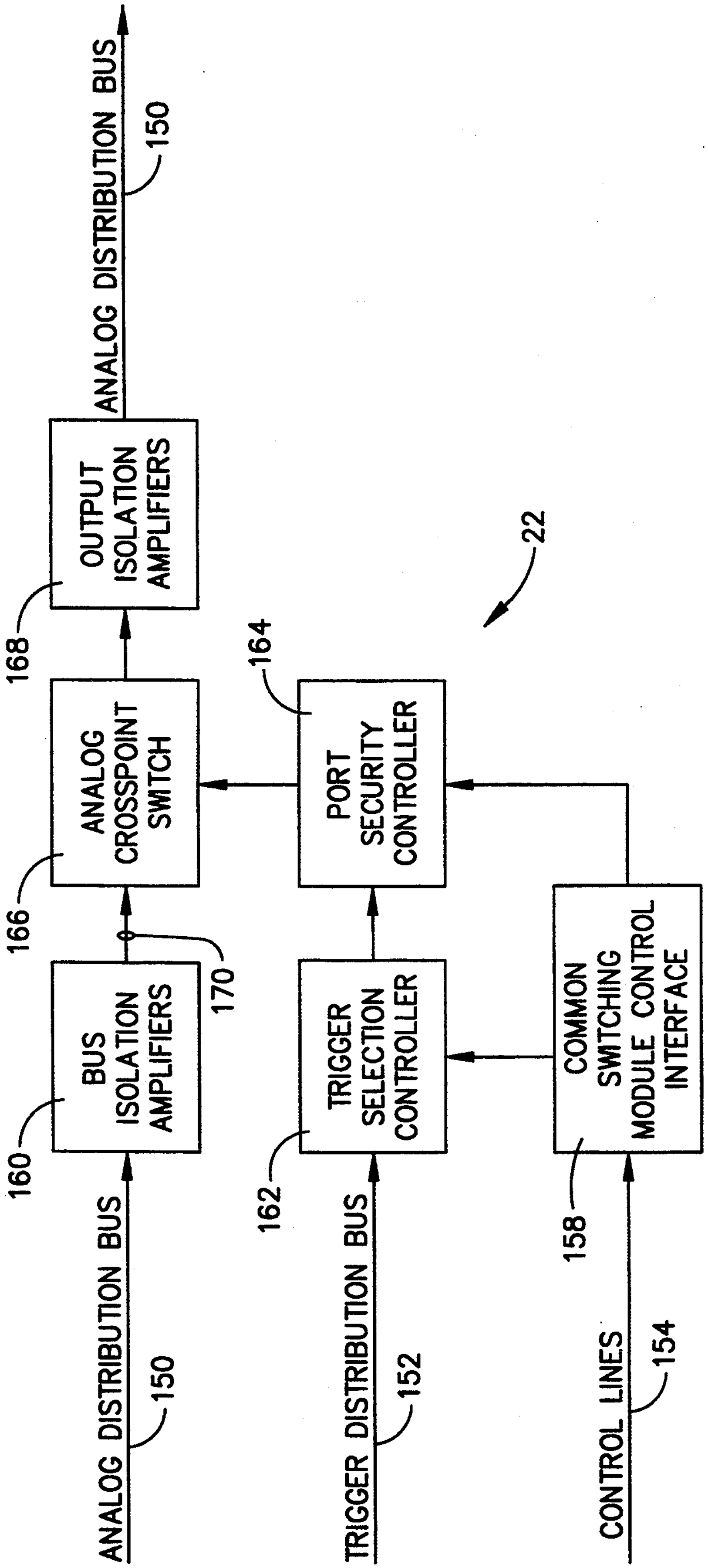
FIG. 8 is a block diagram of an analog switching module.

The detailed operation of the Analog switching module 22 is schematically depicted in FIG. 8, and can be described as follows:

(1) The Common Switching Module Control Interface 34 (for details see FIG. 12) provides the interface from the control system to this switching module. This interface 34 performs the following functions:

(a) Accept the commands from the control system to enable any required security functions.

(b) Accept commands from the control system to determine what trigger inputs will be used to trigger the series of commands.

(c) Accept the crosspoint setup commands from the control system which will be loaded into the crosspoint switch when the correct trigger event occurs.

Figure 12:
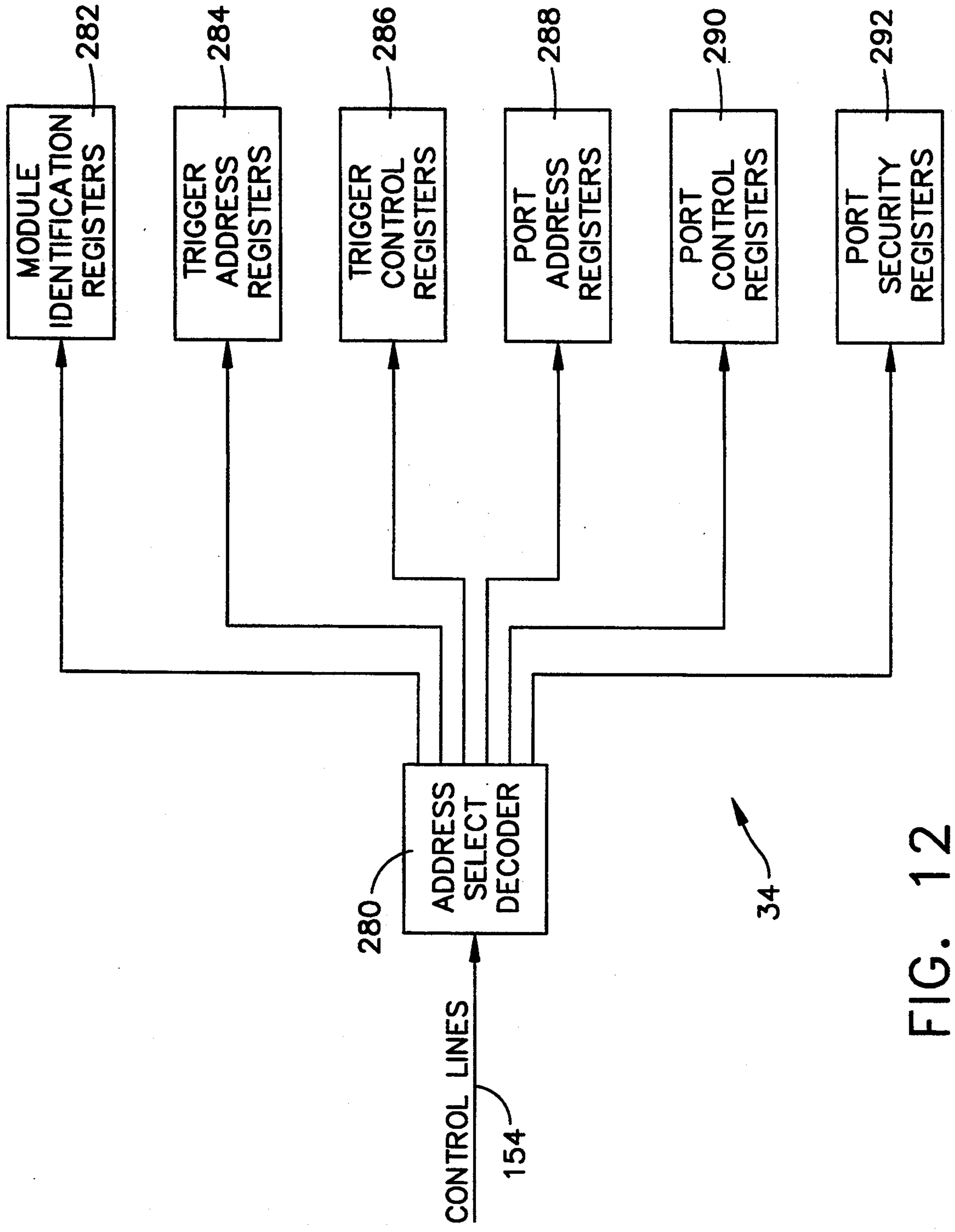
FIG. 12 is a block diagram of a common switching module control interface made in accordance with the present invention, and which is used in each analog switching module and each digital switching module.

(2) The Common Switching Module Control Interface 34 of FIG. 12 is represented on FIG. 8 by the elements 158 and 164. Element 158 would include the Address Select Decoder 280 and the Module Identification Registers 282, Trigger Address Registers 284, and Trigger Control Registers 286 of FIG. 12.

Figure 13:
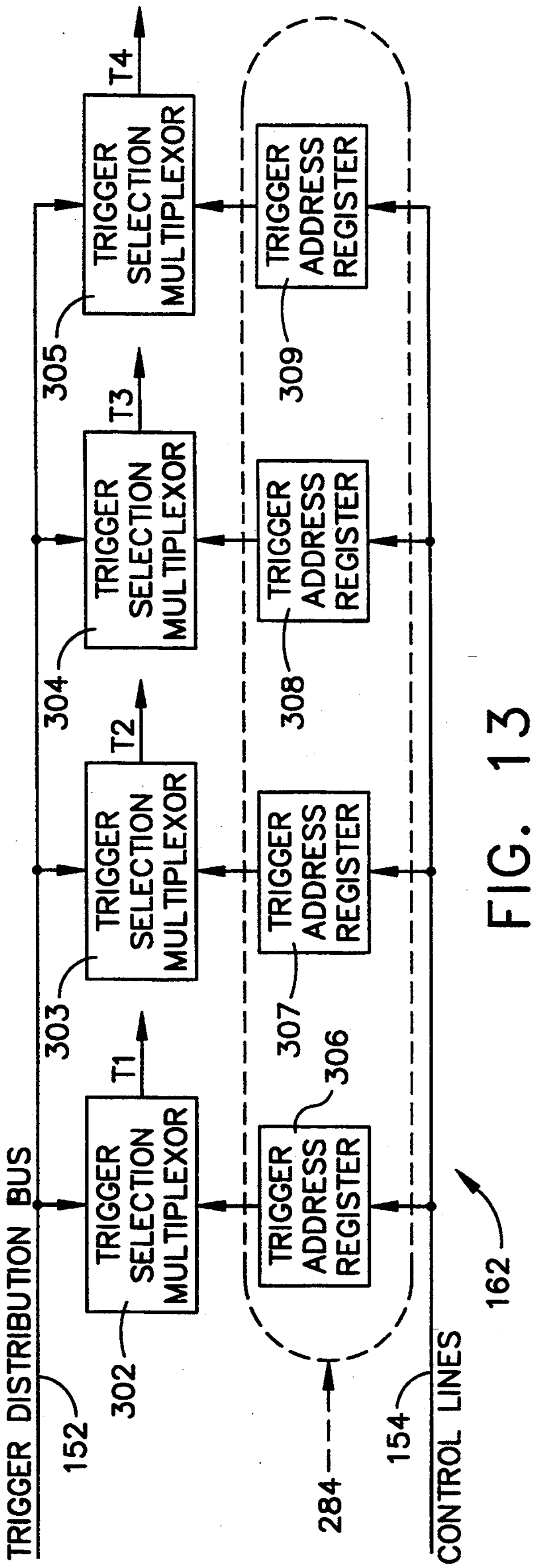
FIG. 13 is a block diagram of the trigger selection controller, which is used in each analog switching module and in each digital switching module.

(3) The Trigger Selection Controller 162 of FIG. 8 is depicted in greater detail in FIG. 13. It should also be noted that the Trigger Address Registers 284 of FIG. 12 are illustrated on FIG. 13, and comprise four registers 306, 307, 308, and 309.

(4) The Port Security Controller 164 only allows appropriate crosspoint switch settings to pass from the control system to the analog crosspoint switch 166 when a trigger event occurs. If the control system requests an invalid switch setup, the control system is notified of the invalid setup and any required actions will be taken by the control system. The Port Security Controller 164 prevented the invalid action to occur at the port level. NOTE: The Port Security Controller 164 on FIG. 8 contains the functions of elements 288, 290, and 292 on FIG. 12.

(5) The analog signals arrive from the analog distribution bus 150 and pass through the bus isolation amplifiers 160. In a preferred arrangement, these amplifiers have the following minimum specifications, depending upon which version Analog Switching Module is needed for the customer's application: Narrow Bandwidth Module: DC to 15 MHz in bandwidth Bandwidth: DC—10 MHz (−0.03 dbm) DC—50 MHz (−3 dbm)

Standard Bandwidth Module: DC to 50 MHz bandwidth

Bandwidth: DC—50 MHz (−0.03 dbm) DC—250 MHz (−3 dbm)

Wide Bandwidth Module: DC to 100 MHz bandwidth

Bandwidth: DC—100 MHz (−0.03 dbm) DC—500 MHz (−3 dbm)

Very Wide Bandwidth Module: DC to 250 MHz Bandwidth

Bandwidth: DC—250 MHz (−0.1 dbm) DC—900 MHz (−3 dbm)

Super Wide Bandwidth Module: 100 Hz to 500 MHz bandwidth

Bandwidth: 100 Hz—500 MHz (−0.03 dbm) 100 Hz—1000 MHz (−3 dbm)

Ultra Wide Bandwidth Module: 100 Hz to 1000 MHz bandwidth

Bandwidth: 100 Hz—1000 MHz (−0.03 dbm) 100 Hz—2000 MHz (−3 dbm)

These amplifiers 160 serve to separate the analog distribution bus 150 on the backplane 4 from the internal analog distribution bus 170 on the switching module 22.

(6) The analog signals pass through the analog cross-point switching array 166 ultimately to the correct outputs on the corresponding analog output modules (if there are any active).

(7) The analog signals are passed through the output isolation amplifiers 168 to the analog distribution bus 150, before the signals arrive at the analog output modules. In a preferred arrangement, these amplifiers 168 have the following minimum specifications, depending upon which version Analog Switching Module is needed for the customer's application: Narrow Bandwidth Module: DC to 15 MHz in bandwidth Bandwidth: DC—10 MHz (−0.03 dbm) DC—50 MHz (−3 dbm)

Standard Bandwidth Module: DC to 50 MHz bandwidth

Bandwidth: DC—50 MHz (−0.03 dbm) DC—250 MHz (−3 dbm)

Wide Bandwidth Module: DC to 100 MHz bandwidth

Bandwidth: DC—100 MHz (−0.03 dbm) DC—500 MHz (−3 dbm)

Very Wide Bandwidth Module: DC to 250 MHz Bandwidth

Bandwidth: DC—250 MHz (−0.1 dbm) DC—900 MHz (−3 dbm)

Super Wide Bandwidth Module: 100 Hz to 500 MHz bandwidth

Bandwidth: 100 Hz—500 MHz (−0.03 dbm) 100 Hz—1000 MHz (−3 dbm)

Ultra Wide Bandwidth Module: 100 Hz to 1000 MHz bandwidth

Bandwidth: 100 Hz—1000 MHz (−0.03 dbm) 100 Hz—2000 MHz (−3 dbm)

These amplifiers 168 serve to isolate the analog signals on the switching module from the analog distribution bus 150 on the backplane 4.

Analog I/O Module:

The function of the Analog I/O module 20 is to provide signal conditioning and preprocessing between the external signals and the internal backplane distribution signal lines. The Analog Input Sections perform the following functions:

(1) Accept commands from the control modules regarding application-specific signal conditioning to be performed.

(2) Accept input from an external signal source.

(3) Perform any application-specific signal conditioning:

(a) Amplitude adjustment (b) Phase angle adjustment (c) Skew or delay time relationship to one or more additional signals (d) Optional conversion to an application specific Digital Signal Format.

(4) Present the signal or signals to the analog and optionally the digital distribution signal lines of the backplane to all modules which require the signals for correct operation.

The Analog Output Sections perform the following functions:

(1) Accept commands from the control modules regarding application-specific signal conditioning to be performed before the signal is output from the switch.

(2) Accept the signal or signals from the analog and optionally the digital distribution signal lines of the backplane from all modules which are to present signals which are used to create the final output signal.

(3) Perform any application-specific signal conditioning which might involve optional conversion from an application-specific digital signal format.

(4) Present output to an external signal destination.

Figure 9:
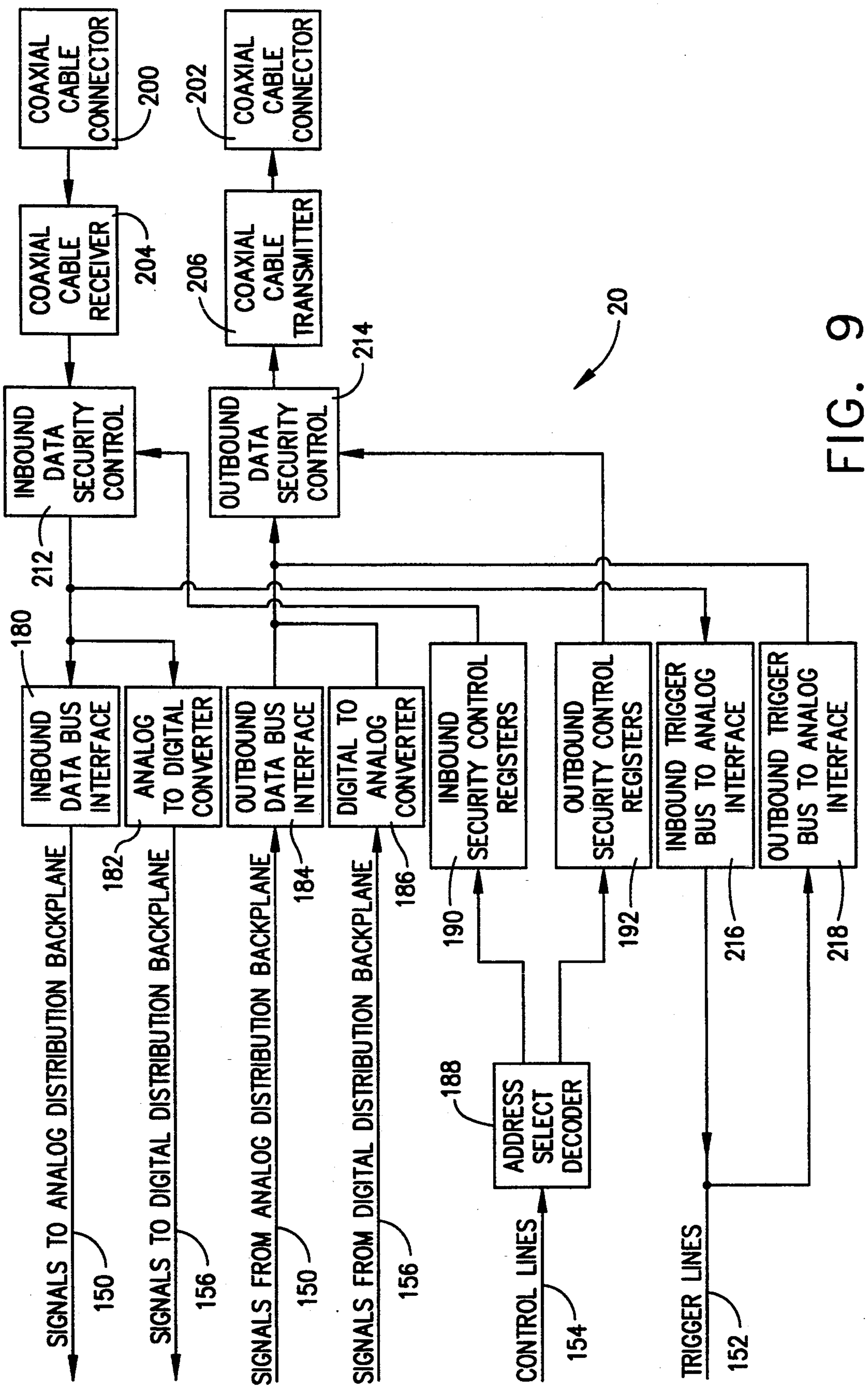
FIG. 9 is a block diagram of an analog input/output module.

The detailed operation of the Analog I/O Module 20 is schematically depicted in FIG. 9, and can be described as follows:

The circuit functions as follows:

(1) The address select decoder 188 reads the address and control signal lines 154 to determine if this module is the correct module. If this is not the correct module ignore all remaining commands.

(2) If the control system selects the Inbound Security Registers, then it will perform the requested function from one of the following:

(a) Return current information (b) Load new information (3) If the control system selects the Outbound Security Registers, then it will perform the requested function from one of the following:

(a) Return current information (b) Load new information (4) The inbound coaxial cable connector 200 connects the external signal to the coaxial cable receiver 204.

(5) The inbound coaxial cable receiver 204 is an isolation amplifier designed to isolate the input signal from the Inbound Data Security Control 212.

(6) Note that for ultra wide bandwidth analog signals (above 500 MHz) the coaxial cable connector 200 of FIG. 9 is replaced by a fiber cable connector, in order to handle the extremely large bandwidth requirements. This, in turn, requires that Inbound Coaxial Cable Receiver 204 be replaced by a fiber-optic receiver. By the same token, under those conditions, the Outbound Coaxial Cable Transmitter 206 of FIG. 9 is replaced by a fiber-optic transmitter, and the Coaxial Cable Connector 202 is replaced by a fiber cable connector.

(7) The Inbound data security control 212 is designed to prevent selected input signals from being presented to the signal distribution buses under selected conditions. If the security request would cause the incoming signal to enter the denied state, the incoming signal is isolated from the analog (and optionally the digital) distribution backplane buses 150 and 156.

(8) The Inbound data bus interface 180 is an amplifier designed to isolate the Analog signal distribution bus 150 of the backplane from the signals on the I/O Module.

(9) The Optional Inbound analog-to-digital converter 182 is designed to present an analog signal to the digital distribution bus 156 in an application-specific format.

(10) The Outbound data bus interface 184 is an amplifier designed to isolate the Analog signal distribution bus 150 of the backplane 4 from the outgoing signals on the I/O Module.

(11) The Optional Outbound analog-to-digital converter 186 is designed to recreate the analog signal from an application-specific digital format found on the digital distribution bus 156. This analog signal will then proceed through the remainder of the output processing.

(12) The Outbound data security control register 192 is designed to prevent selected output signals from being presented to the signal outputs under selected conditions as discussed in further detail below. If the security request causes the outgoing signal to enter the denied state, the outgoing signal is isolated from the analog and optionally the digital distribution backplane buses 150 and 156.

(13) The Outbound coaxial cable transmitter 206 is an isolation amplifier designed to isolate the output of Outbound Data Security Control 214 from the output signal.

(14) The outbound coaxial cable connector 202 connects the coaxial cable transmitter 206 to the external signal.

(15) The trigger lines of the Trigger Bus Interface 152 are connected to an Outbound Trigger Bus-to-Analog Interface 218, and to an Inbound Trigger Bus-to-Analog Interface 216. These interfaces are, in turn, connected to the Outbound Data Security Control 214 and the Inbound Data Security Control 212, respectively. The use of signals which can be routed through these interfaces 216 and 218 are application-dependent.

Digital Switching Module:

The function of the Digital Switching module 30 is to provide switching of digital signals. The purpose of the circuit is to provide a means to allow independent selection for each output from any of the narrow bandwidth Digital signal inputs.

The detailed operation of the Digital Switching Module 30 is schematically depicted in FIG. 10, and can be described as follows:

(1) The Common Switching Module Control Interface 34 (for details see FIG. 12) provides the interface from the control system 10 to this switching module. This interface performs the following functions:

(a) Accept the commands from the control system to enable any required security functions.

(b) Accept commands from the control system to determine what trigger inputs will be used to trigger the series of commands.

(c) Accept the crosspoint setup commands from the control system which will be loaded into the crosspoint switch when the correct trigger event occurs.

(2) The Common Switching Module Control Interface 34 of FIG. 12 is represented in FIG. 10 by the elements 158 and 164. Specifically, element 158 represents the Address Select Decoder 280, Module Identification Registers 282, Trigger Address Registers 284, and Trigger Control Registers 286 of FIG. 12.

(3) The Trigger Selection Controller 162 of FIG. 10 is depicted in greater detail as in of FIG. 13.

(4) The Port Security Controller 164 allows only appropriate crosspoint switch settings to pass from the control system to the digital crosspoint switch 226 upon the occurrence of a trigger event. If the control system requests an invalid switch setup, the control system is notified of the invalid setup and any required actions will be taken by the control system. The Port Security Controller 164 prevented the invalid action to occur at the port level. It should be noted that the port security controller 164 on FIG. 10 contains the functions of elements 288, 290, and 292 on FIG. 12.

(5) The digital signals arrive from the digital distribution bus 156 and pass through the bus isolation drivers 220. In a preferred arrangement, these drivers have the following minimum specifications, depending upon which version Digital Switching Module is needed for the particular customer's application: Narrow Bandwidth Module: 0–50 Million bits per second Maximum Rise time: 2 nsec
Maximum Pulse Duration: 15 nsec
Maximum Fall time: 2 nsec
Minimum Clock period: 20 nsec Standard Bandwidth Module: 0–100 Million bits per second Maximum Rise time: 2 nsec
Maximum Pulse Duration: 5 nsec
Maximum Fall time: 2 nsec
Minimum Clock period: 10 nsec Wide Bandwidth Module: 0–350 Million bits per second Maximum Rise time: 150 psec
Maximum Pulse Duration: 1 nsec
Maximum Fall time: 150 psec
Minimum Clock period: 2 nsec Very Wide Bandwidth Module: 0–500 Million bits per second Maximum Rise time: 150 psec
Maximum Pulse Duration: 750 psec
Maximum Fall time: 150 psec
Minimum Clock period: 1.5 nsec Super Wide Bandwidth Module: 0=1300 Million bits per second Maximum Rise time: 100 psec
Maximum Pulse Duration: 250 psec
Maximum Fall time: 100 psec
Minimum Clock period: 600 psec Ultra Wide Bandwidth Module: 0–3500 Million bits per second Maximum Rise time: 50 psec
Maximum Pulse Duration: 100 psec
Maximum Fall time: 50 psec
Minimum Clock period: 250 psec Drivers 220 serve to separate the digital distribution bus 156 on the backplane 4 from the internal digital distribution bus 230 on the switching module 30.

(6) The digital signals pass through the digital crosspoint switching array 226 ultimately to the correct outputs on the digital output modules (if there are any active).

(7) The digital signals are passed through the output isolation drivers 228 to the digital distribution bus 156, before the signals arrive at the digital output modules. In a preferred arrangement, these drivers 228 have the following minimum specifications, depending upon which version Digital Switching Module is needed for the customer's application:

Narrow Bandwidth Module: 0–50 Million bits per second
Maximum Rise time: 2 nsec
Maximum Pulse Duration: 15 nsec
Maximum Fall time: 2 nsec
Minimum Clock period: 20 nsec Standard Bandwidth Module: 0–100 Million bits per second
Maximum Rise time: 2 nsec
Maximum Pulse Duration: 5 nsec
Maximum Fall time: 2 nsec
Minimum Clock period: 10 nsec Wide Bandwidth Module: 0–350 Million bits per second
Maximum Rise time: 150 psec
Maximum Pulse Duration: 1 nsec
Maximum Fall time: 150 psec
Minimum Clock period: 2 nsec Very Wide Bandwidth Module: 0–500 Million bits per second
Maximum Rise time: 150 psec
Maximum Pulse Duration: 750 psec
Maximum Fall time: 150 psec
Minimum Clock period: 1.5 nsec Super Wide Bandwidth Module: 0=1300 Million bits per second
Maximum Rise time: 100 psec
Maximum Pulse Duration: 250 psec
Maximum Fall time: 100 psec
Minimum Clock period: 600 psec Ultra Wide Bandwidth Module: 0–3500 Million bits per second
Maximum Rise time: 50 psec
Maximum Pulse Duration: 100 psec
Maximum Fall time: 50 psec
Minimum Clock period: 250 psec Drivers 228 serve to isolate the digital signals on the switching module from the digital distribution bus 156 on the backplane 4.

Digital I/O Module: The function of the Digital I/O module 28 is to provide signal conditioning and preprocessing between the external signals and the internal backplane distribution signal lines. The Digital Input Sections perform the following functions:

(1) Accept commands from the control modules regarding application-specific signal conditioning to be performed.
(2) Accept input from an external signal source.
(3) Perform any application-specific signal conditioning, such as
  (a) Level Changing (eg. ECL to TTL, TTL to Gas)
  (b) Skew or delay time relationship to one or more additional signals
  (c) Optional conversion to an application specific Analog Signal Format.
(4) Present the signal or signals to the digital (and optionally the analog) distribution signal lines of the backplane to all modules which require the signals for correct operation.

The digital output sections of module 28 perform the following functions:

(1) Accept commands from the control modules regarding application-specific signal conditioning to be performed before the signal is output from the switch.
(2) Accept the signal or signals from the digital (and optionally the analog) distribution signal lines of the backplane from all modules which are to present signals which are used to create the final output signal.
(3) Perform any application-specific signal conditioning, such as
  (a) Level Changing (eg. ECL to TTL, TTL to Gas); or
  (b) Optional conversion of an analog signal to an application specific Digital Signal.
(4) Present output to an external signal destination.

Figure 11:
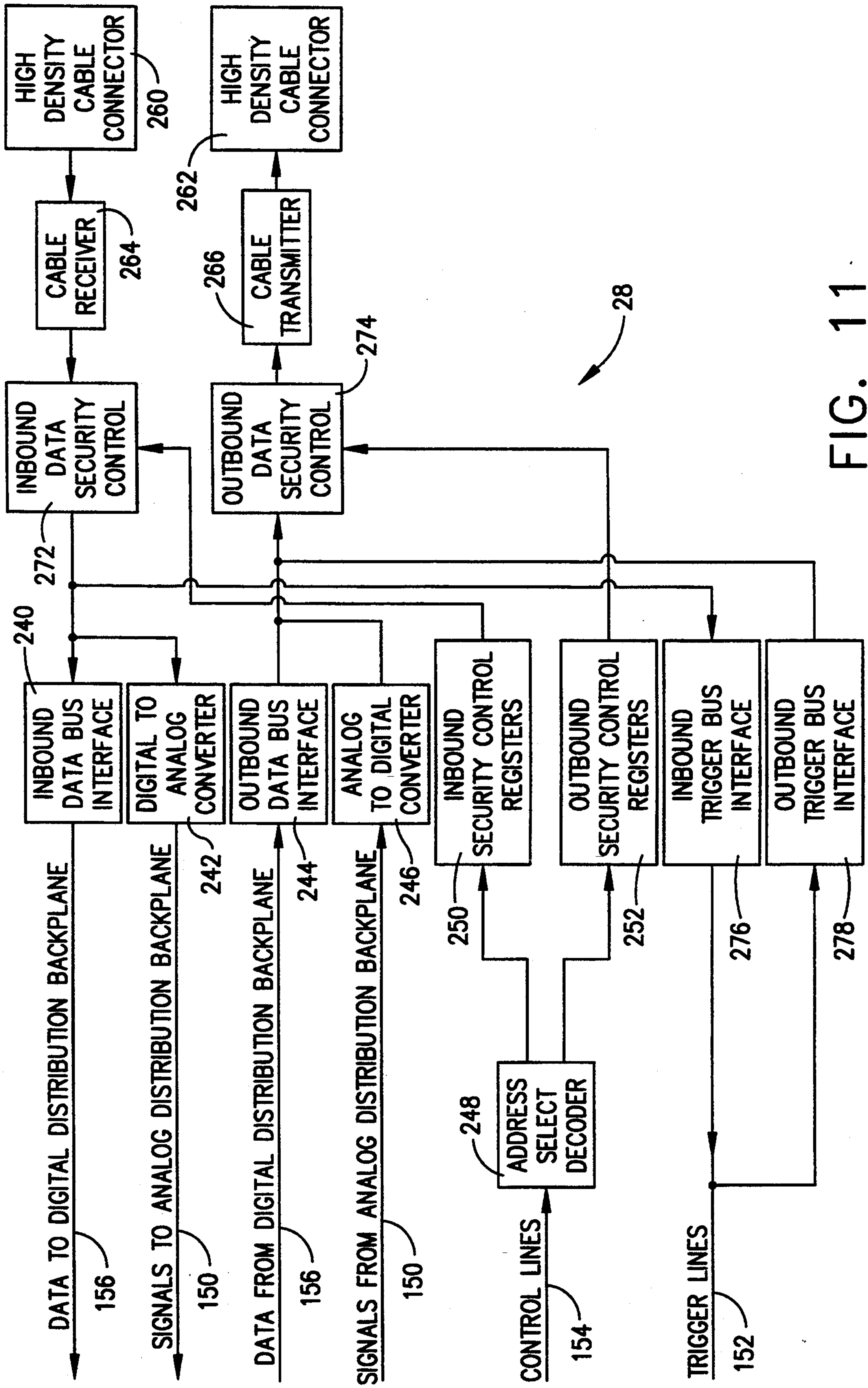
FIG. 11 is a block diagram of a digital input/output module.

The detailed operation of the Digital I/O Module 28 is schematically depicted in FIG. 11, and can be described as follows:

The circuit functions as follows:

(1) The address select decoder 248 reads the address and control signal lines 154 to determine if module 28 is the correct module. If this is not the correct module ignore all remaining commands.
(2) If the control system selects the Inbound Security Control Registers 250, then module 28 will perform the requested function from one of the following:
  (a) Return current information, or
  (b) Load new information.
(3) If the control system selects the Outbound Security Control Registers 252, then module 28 will perform the requested function from one of the following:
  (a) Return current information, or
  (b) Load new information.
(4) The inbound coaxial cable connector 260 connects the external signal to the coaxial cable receiver 264.
(5) The inbound coaxial cable receiver 264 is an isolation amplifier designed to isolate the input signal from the Inbound Data Security Control 272.
(6) Note that the High Density Cable Connectors 260 and 262 of FIG. 11 may be replaced by appropriate different styles of connectors at various greater data rates. In a preferred embodiment, Digital I/O Modules 28 which are to handle signals in the Wide Bandwidth (up to 350 Million bits per second) range through the Super Wide Bandwidth range (up to 1300 Million bits per second) use coaxial cable connectors instead of the high density cable connectors. Additionally, such modules will use a coaxial cable receiver 264 and transmitter 266, instead of regular receivers and transmitters under those conditions. If the data rate is greater than 1300 million bits per second, an Ultra Wide Bandwidth Digital I/O Module 28 is used, which contains Fiber Optic Cable Connectors 260 and 262, and a Fiber-Optic Receiver 264 plus a Fiber-Optic Transmitter 266.
(7) The Inbound data security control 272 is designed to prevent selected input signals from being presented to the signal distribution buses under selected conditions. If the security request would cause the incoming signal to enter the denied state, the incoming signal is isolated from the digital and optionally the analog distribution backplane buses 156 an 150.
(8) The Inbound data bus interface 240 is a driver designed to isolate the Digital signal distribution bus 156 of the backplane 4 from the signals on the I/O Module.
(9) The optional Inbound digital-to-analog converter 242 is designed to present an application-specific digital signal to the analog distribution bus 150 in an application-specific format.

(10) The Outbound data bus interface 244 is a driver designed to isolate the digital signal distribution bus 156 of backplane 4 from the outgoing signals on the I/O Module.

(11) The optional Outbound analog to digital converter 246 is designed to create the digital signal from an application-specific analog format found on the analog distribution bus 150. This digital signal will then proceed through the remainder of the output processing.

(12) The Outbound data security control register 252 is designed to prevent selected output signals from being presented to the signal outputs under selected conditions, as described in further detail below. If the Security request would cause the outgoing signal to enter the denied state, the outgoing signal is isolated from the digital and optionally the analog distribution backplane buses 150 and 156.

(13) The Outbound coaxial cable transmitter 266 is an isolation amplifier designed to isolate the output of the Outbound Data Security Control 274 from the output signal.

(14) The outbound coaxial cable connector 262 connects the cable transmitter 266 to the external signal.

(15) The trigger lines of the Trigger Bus Interface 152 are connected to an Outbound Trigger Bus Interface 278 and an Inbound Bus Interface 276. These interfaces are, in turn, connected to the Outbound Data Security Control 274 and the Inbound Data Security Control 272, respectively. The trigger lines can thus be placed in communication with external equipment through digital input and output ports of the digital I/O Module 28.

Common Switching Module Control Interface:

The function of the Common Switching Module Control Interface 34 is to provide the interface between the control signals and the analog and digital switching modules. The purpose of the circuit is as follows:

(1) Allow selection of individual modules within a switch.

(2) Allow selection of individual ports within a module.

(3) Allow selection of various security and control options within a port.

The detailed operation of interface 34 is schematically depicted in FIG. 12, and can be described as follows:

The circuit functions as follows:

(1) The address select decoder 280 reads the address and control signal lines 154 to determine if this module is the correct module.

(2) If this module is selected, then the sub selection of the correct set of registers within the module continues.

(3) In a preferred embodiment, the registers which may be selected include:

Module Identification Registers 282.
Trigger Address Registers 284.
Trigger Control Registers 286.
Port Address Registers 288.
Port Control Registers 290.
Port Security Registers 292.

(4) After the correct register is selected, then data may be sent to or received from the control system.

(5) After the data is transferred, then the appropriate action will occur within the module. (A description of each module for explanation of what an appropriate action could be.)

Trigger Selection Controller:

The function of the Trigger Selection Controller 162 is to provide trigger pulse selection for the switching modules. The purpose of the circuit is as follows:

(1) Allows independent control and selection of up to 4 triggers per output port.

(2) Provides positive read back of the selected trigger selection setup.

The detailed operation of the module 162 is schematically depicted in FIG. 13, and can be described as follows:

(1) The trigger distribution bus 152 presents all trigger signals (pulses) to each of the trigger selection multiplexors 302, 303, 304, and 305. Up to four multiplexors can exist per output channel in the preferred embodiment, however it should be noted that any number of multiplexors could be used per output port.

(2) The trigger selection multiplexor 302, 303, 304, or 305 selects which (if any) trigger pulse should be output.

(3) The trigger address registers 306, 307, 308, and 309 control which trigger line T1, T2, T3, or T4 (if any) will be selected.

Time Slot Switching Module:

The function of the Time Slot Switching Module 320 is to provide switching of time division multiplexed digital signals. In a preferred embodiment, digital signals having data rates between 0 and 1800 Million bits per second in bandwidth can be handled by this Module 162. The purpose of the circuit include the following:

(1) Divide an incoming data stream into individual segments.

(2) Store the segments in memory.

(3) Assemble segments into new data streams for output.

Figure 14:
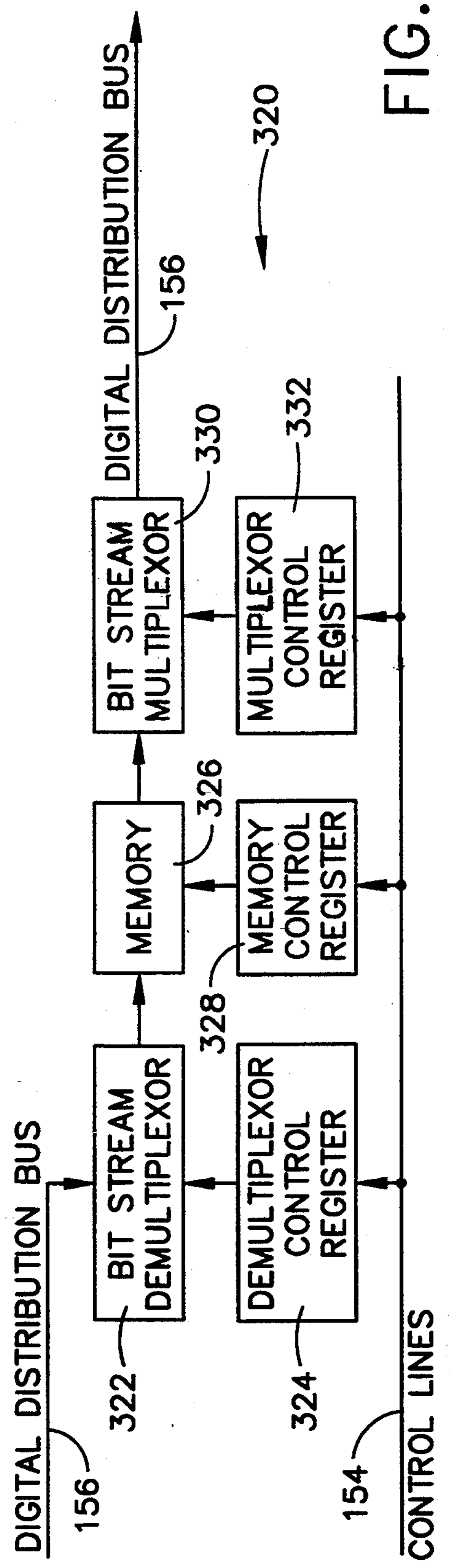
FIG. 14 is a block diagram of a time slot switching module.

The detailed operation of module 162 is schematically depicted in FIG. 14, and can be described as follows:

(1) The data signal from the digital distribution bus 156 is input into the bit stream demultiplexor 322. The digital distribution bus 156 also provides a clock signal.

(2) The bit stream demultiplexor 322 accumulates a specific number of bits from the incoming data stream. The order, spacing, and number of bits collected as a group is governed by the demultiplexor control registers 324, which are in turn controlled by the microprocessor 48.

(3) After the bits are acquired, they are assembled into a storage packet and placed in memory 326. The order they are placed in memory is dependent upon the memory control register 328.

(4) The bit stream multiplexor 330 assembles an outbound bit stream from memory packets. The ordering, spacing, and timing of the outbound bit stream is controlled by the bit stream multiplexor control register 332.

The operation of both Digital Crosspoint Switches 226 and Analog Crosspoint Switches 166 is controlled by predetermined trigger events. The predetermined trigger events are programmed by the microprocessor 48 in advance of any triggering event occurrence. In the illustrated embodiment, up to four predetermined trigger event commands can be stacked up for each Digital Output or for each Analog Output. As mentioned, the maximum limit of four stacked-up commands is shown only as a preferred example. By simply adding further electronic hardware to the Trigger Selection Controller 162 (see FIG. 13), additional stacked-up commands per output can be implemented as desired. Of course, an expansion of the number of lines in the Trigger Distribution Bus 152 could also be implemented to correspond to any increase in the number of stacked-up commands per output.

In order to stack-up the appropriate commands, the microprocessor 48 loads a particular trigger address via the Control Lines 154, into a predetermined Trigger Address Register 306, 307, 308, or 309 (see FIG. 13). Each Trigger Address Register 306–309 holds the appropriate trigger address thereafter, independent of and regardless of what operations the microprocessor 48 is performing. In this way, the Trigger Address Registers 306–309 are available to immediately respond to future triggering events.

The output of each Trigger Address Register 306–309 is communicated to its corresponding Trigger Selection Multiplexor 302, 303, 304, or 305. Each Trigger Selection Multiplexor 302–305 can select any one of the sixty-four (64) trigger lines of the Trigger Distribution Bus 152 illustrated, for output as signals T1, T2, T3, or T4.

The operational steps required to actuate a given crosspoint switch are as follows:

(1) A bit map is loaded into the Port Security Registers 292 (see FIG. 12), instructing the multi-media switching system 10 which input ports are allowed to be selected for each output port.

(2) The Port Address Registers 288 are loaded with information which determines whether a particular output port (analog or digital output) is to be connected to any input, and if so, which trigger line T1–T4 of the particular output port is to be associated with which given input. Note that each output port (analog or digital) has four trigger lines T1–T4 in the illustrated embodiment, which can be used to sequentially connect up to four different input signals to that output port.

(3) The Trigger Address Registers 306–309 are loaded with stacked-up command information, as described above, to determine which lines of the Trigger Distribution Bus 152 will be used to activate trigger lines T1–T4.

(4) The "Go" bit is set in the Port Control Registers 290, which initiates the operational mode which allows for the activation of trigger lines T1–T4 to occur upon the appropriate triggering event.

(5) Upon the occurrence of the appropriate triggering event, trigger line T1 changes state from logic 0 to logic 1. The signal on trigger line T1 leaves the Trigger Selection Controller 162 (on FIG. 10) for a digital signal, and, if the Port Security Controller 164 allows the input port chosen by the Port Address Registers 288 (upon T1 going to logic 1) to be connected to this particular output port, then the input port address is loaded into the Digital Crosspoint Switch 226, which electrically connects the proper input port to this output port. A similar sequence of events occurs for analog signals on an Analog Switching Module 22 (see FIG. 8). Note that the construction of a crosspoint switch as used above is well known in the art.

(6) Trigger line T1 is only activated once (i.e., it is a one-shot). Even if the same triggering event occurs, T1 will not again go into the logic 1 state, unless T1 is reset in a further processing command.

(7) Trigger lines T2, T3, and T4 are sequentially activated in the same manner upon the occurrence of their particular triggering events. T3 cannot activate to logic 1 until after T2 does so, and T4 cannot activate until T3 does so.

The Optional Signal Converter 58 (on FIG. 3) allows any of the System Control Module ports 40, 42, 44 and/or 46 to be connected to any digital data bus lines 156 for either reception or transmission. By connecting the appropriate digital data bus lines 156 to digital inputs and digital outputs (through digital crosspoint switches 226 on Digital Switching Modules 30) residing on Digital I/O Modules 28, the System Control Module 12 (or Alternate System Control Module 6) residing on one chassis 3 can directly communicate to another System Control Module on a second chassis 3A (see FIG. 2). The appropriate Digital I/O Modules 28 and Digital Switching Modules 30 can be chosen to easily handle the data rates at which the System Control Module ports 40, 42, 44, and 46 communicate to and from the microprocessor 48.

In a system where two chassis are communicating with each other, as described above, each of the System Control Modules 12 (one per chassis) act as co-equals. In other words, one System Control Module 12 does not dominate the other. If a trigger request needs to activate crosspoint switches (either analog or digital) on more than one chassis 3, then each System Control Module 12 sets up its stacked-up commands to control the appropriate crosspoint switches on its own chassis 3. Individual trigger lines, or for that matter, the entire Trigger Distribution Bus 152 can be connected from one chassis 3 to the second chassis 3A. It will be understood that certain trigger lines are connected between the two chassis in order to achieve simultaneous switching of signals in each chassis. When the trigger line of interest is activated on one chassis 3, the appropriate crosspoint switches will actuate on that same chassis 3. The trigger line of interest will simultaneously activate on the second chassis 3A (since the appropriate trigger lines have been connected from chassis 3 to chassis 3A), and therefore, the appropriate crosspoint switches will actuate on the second chassis 3A.

In order to connect the trigger lines of one chassis 3 to a second chassis 3A, the interconnecting trigger lines must be buffered through a Digital I/O Module 28. On FIG. 11, the Trigger Distribution Bus 152 is brought into the module 28 through interfaces 276 and 278. The trigger signals are then communicated to individual digital input and output ports through Data Security Controls 272 and 274.

Using high-speed communication means, the interconnection of more than one chassis could be implemented over very long distances. In fact, one chassis 3 (e.g., in New York City) could be interconnected to other chassis in other cities.

A combination of two high-speed multi-media switching systems 10 can be used to act as a Multiplexor-Demultiplexor. The first switching system, which resides on chassis 3, can receive a multitude of incoming data streams at its digital input module(s) 24. These multiple data streams can be combined into one reassembled data stream which is output from the chassis 3 via a digital output port residing on a digital output module 26. Note: if the incoming data streams consist of analog signals, they can be received by analog input module(s) 16, digitized by an Analog-to-Digital Converter 182 (see FIG. 9), and then each sent via the Digital Distribution Bus 156 to a Time Slot Switching Module 320. The Time Slot Switching Modules 320 divide the digitized data streams, store them in memory 326, and then reassemble them into a single data stream for output (at a digital output module 26).

The data stream is sent from chassis 3 to a digital input port on the second switching system, which resides on chassis 3A. Once inside chassis 3A, the data stream is sent to a Time Slot Switching Module 320 via the Digital Distribution Bus 156. The data stream is then divided by the Time Slot Switching Module 320, stored in memory 326, and then reassembled into a multitude of outgoing data streams. The outgoing data streams are configured such that each individual data stream is identical to each corresponding data stream that was received by the first switching system residing on chassis 3. The reassembled outgoing data streams are sent through digital switching modules 30, and then to individual digital output ports on digital output module(s) 26, via the Digital Distribution Bus 156. If the outgoing data streams are to be analog signals, then the individual reassembled data streams are sent from the individual Time Slot Switching Module 320 on chassis 3A, through digital switching modules 30, and then to analog output modules 18 via the Digital Distribution Bus 156. Once received by the analog output modules 18, the reassembled data streams are converted to analog signals by the Digital-to-Analog Converter 186, (see FIG. 9), and sent to individual analog output ports.

In summary, numerous benefits have been described which result from employing the concepts of the invention. The subject high-speed multi-media switching system provides a single control system which can control the switching of both digital and analog signals, can control both analog and digital input/output modules, and can control the sequential operation of the switching of any given input, analog or digital, to any given output (also either analog or digital). The switching system can also control the switching between two video input signals having either common synchronization or independent synchronization, and can make such switching to appear glitchless to one viewing the video output signal. The switching system also contains security verification so that, for any given output (whether digital or analog), only the correct inputs may be switched into that output. The inventive switching system is capable of stacking up trigger event commands such that several different input signals can be sequentially switched into one given output port, all controlled by a predetermined set of stacked-up trigger event commands. The switching system is further capable of communicating to a multitude of external similar switching systems such that triggering events which occur in the first switching system can be communicated to other switching systems, thus actuating both analog and digital switches in those other, external switching systems. Such external switching systems can be locally or remotely located.

The foregoing description of the preferred embodiments of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A high-speed multi-media switching system that switches both analog signal and digital signals, said system comprising:

(a) a first interface which communicates with external analog electrical signals, said first interface creating analog signals, said analog signals being communicated to an analog bus;

(b) a second interface which communicates with external digital electrical signals, said second interface creating digital signals, said digital signals being communicated to a digital bus;

(c) a plurality of analog crosspoint switches, each of said analog crosspoint switches having a first input side, a first output side, and a first control input, said first input side being communicated from said analog bus, said first output side being communicated to said analog bus, said first control input being communicated from a control bus;

(d) a plurality of digital crosspoint switches, each of said digital crosspoint switches having a second input side, a second output side, and a second control input, said second input side being communicated from said digital bus, said second output side being communicated to said digital bus, said second control input being communicated from said control bus; and (e) a central control system, comprising:

(i) the control bus, said control bus controlling communications with said external analog electrical signals by use of said first interface and said analog bus;

(ii) a trigger bus, said trigger bus communicating with a trigger selection controller, said trigger selection controller having a plurality of outputs which are communicated to at least one trigger line, said at least one trigger line controlling the switching of said analog signals by communicating with the first control input of an individual analog crosspoint switch of said plurality of analog crosspoint switches, thereby controlling the analog crosspoint switch's operation;

(iii) said control bus additionally controlling communications with said external digital electrical signals by use of said second interface and said digital bus;

(iv) said trigger bus additionally communicating with said trigger selection controller, said at least one trigger line controlling the switching of said digital signals by communicating with the second control input of an individual digital crosspoint switch of said plurality of digital crosspoint switches, thereby controlling the digital crosspoint switch's operation;

(v) a trigger signal generating circuit that receives signals from one or more of said analog bus, digital bus, control bus, and trigger bus, said trigger signal generating circuit outputting multiple, substantially simultaneous trigger signals upon said trigger bus; and (vi) a processing unit which controls said control bus, trigger bus, and trigger selection controller by determining under what conditions the outputs of the trigger selection controller will change state, thereby controlling which signal lines of said analog bus are switched, via said analog crosspoint switches, to which signal lines of said analog bus and under what triggering conditions, and controlling which signal lines of said digital bus are switched, via said digital crosspoint switches, to which signal lines of said digital bus and under what triggering conditions.

2. A high-speed multi-media switching system as recited in claim 1, wherein said first interface for communicating with external analog electrical signals comprises an analog input/output module.

3. A high-speed multi-media switching system as recited in claim 1, wherein said second interface for communicating with external digital electrical signals comprises a digital input/output module.

4. A high-speed multi-media switching system as recited in claim 1, wherein said analog crosspoint switches comprise an analog switching module.

5. A high-speed multi-media switching system as recited in claim 1, wherein said digital crosspoint switches comprise a digital switching module.

6. A high-speed multi-media switching system as recited in claim 1, wherein said processing unit, control bus, and trigger bus comprise a system control module.

7. A high-speed multi-media switching system as recited in claim 1, further comprising a video synchronization trigger module.

8. A high-speed multi-media switching system as recited in claim 1, wherein said analog crosspoint switches includes a first common switching module interface, and said digital crosspoint switches include a second common switching module control interface.

9. A high-speed multi-media switching system as recited in claim 1, further comprising a time slot switching module.

10. A high-speed multi-media switching system as recited in claim 2, wherein said analog input/output module comprises analog input and analog output ports which can communicate with external analog electrical signals having bandwidths of up to 1000 MHz.

11. A high-speed multi-media switching system as recited in claim 3, wherein said digital input/output module comprises digital input and digital output ports which can communicate with external digital electrical signals having data rates of up to 3500 million bits per second.

12. A high-speed multi-media switching system as recited in claim 4, wherein said analog switching module comprises a plurality of analog crosspoint switches which have the capacity of switching analog signals having bandwidths of up to 1000 MHz.

13. A high-speed multi-media switching system as recited in claim 5, wherein said digital switching module comprises a plurality of digital crosspoint switches which have the capacity of switching digital signals having data rates of up to 3500 million bits per second.

14. A high-speed multi-media switching system as recited in claim 6, wherein said system control module includes a signal convertor to interlock and synchronize with a redundant system control module, includes a microprocessor and control input and logging ports to control said analog and digital input/output modules and said analog and digital switching modules, and includes security input and logging ports to perform security verification and logging functions.

15. A high-speed multi-media switching system as recited in claim 7, wherein said video synchronization trigger module comprises a first synchronization circuit which provides glitchless switching between two video signals having common NTSC synchronization.

16. A high-speed multi-media switching system as recited in claim 7, wherein said video synchronization trigger module comprises a second synchronization circuit which provides glitchless switching between two video signals having common PAL synchronization.

17. A high-speed multi-media switching system as recited in claim 7, wherein said video synchronization trigger module comprises a third synchronization circuit which provides glitchless switching between two video signals having common SECAM synchronization.

18. A high-speed multi-media switching system as recited in claim 7, wherein said video synchronization trigger module comprises a fourth synchronization circuit which provides glitchless switching between two video signals having common independent synchronization.

19. A high-speed multi-media switching system as recited in claim 8, wherein each said common switching module control interface comprises a first control circuit which selects individual analog and digital switching modules within a high-speed multi-media switching system, a second control circuit which selects individual communication ports within said analog crosspoint switches, a third control circuit which selects individual communication ports within said digital crosspoint switches, and a fourth control circuit which selects individual security and control options within a port.

20. A high-speed multi-media switching system as recited in claim 1, wherein said trigger selection controller further comprises a fifth control circuit which provides independent control and selection of a plurality of triggers per output port, and a sixth control circuit which provides positive read back of the selected trigger selection setup.

21. A high-speed multi-media switching system as recited in claim 1, wherein said trigger selection controller comprises a plurality of trigger selection multiplexors and a plurality of trigger address registers which operate according to the following sequence of operations:

(a) said analog signals that are to be switched are in communication with the first input side of said plurality of analog crosspoint switches;

(b) said trigger selection controller stacks up a plurality of preset commands which, upon the occurrence of each of a plurality of predetermined events cause, in the proper sequence, at least one predetermined analog crosspoint switch operates of said plurality of analog crosspoint switches; and (c) upon the occurrence of one of said plurality of predetermined events, said at least one analog crosspoint switch operates to connect the first input side of the analog switch to the first output side of the same analog switch, thus allowing the analog signal to travel through the analog switch.

22. A high-speed multi-media switching system as recited in claim 1, wherein said trigger selection controller comprises a plurality of trigger selection multiplexors and a plurality of trigger address registers which operate according to the following sequence of operations:

(a) said digital signals that are to be switched are in communication with the second input side of said plurality of digital crosspoint switches;

(b) said trigger selection controller stacks up a plurality of preset commands which, upon the occurrence of each of a plurality of predetermined events cause, in the proper sequence, at least one predetermined digital crosspoint switch operates of said plurality of digital crosspoint switches; and (c) upon the occurrence of one of said plurality of predetermined events, said at least one digital crosspoint switch operates to connect the second input side of the digital switch to the second output side of the same digital switch, thus allowing the digital signal to travel through the digital switch.

23. A high-speed multi-media switching system as recited in claim 1, wherein said trigger selection controller comprises a plurality of trigger selection multiplexors and a plurality of trigger address registers which stack up a plurality of trigger event commands for each analog output and for each digital output, said plurality of trigger event commands determining the actuation of said analog crosspoint switches upon the occurrence of a predetermined sequence of triggering events, said plurality of trigger event commands also determining the actuation of said digital crosspoint switches upon the occurrence of a predetermining sequence of triggering events.

24. A high-speed multi-media switching system as recited in claim 23, further comprising a seventh control circuit which provides security verification, wherein said switching of analog signals and switching of digital signals occurs only if the seventh control circuit determines that the predetermined input signal is allowed to be connected to the predetermined output port.

25. A high-speed multi-media switching system as recited in claim 9, wherein said time slot switching module comprises a disassembly circuit that divides an incoming data stream into individual segments, computer memory, a memory interface circuit which stores said segments in said computer memory, and a reassembly circuit that assembles said segments into new data streams for output.

26. A high-speed multi-media switching system as recited in claim 14, wherein said redundant system control module includes a microprocessor and control input and logging ports to control a portion of said analog and digital input/output modules according to a first portion of a predetermined control scheme, includes a microprocessor and control input and logging ports to control a portion of said analog and digital switching modules according to a second portion of a predetermined control scheme, and includes security input and logging ports to perform a portion of the security verification and logging functions according to a third portion of a predetermined control scheme.

27. A multi-media high-speed switching assembly, comprising a plurality of high-speed multi-media switching systems having the capability to communicate control information and data information to each other, said switching systems each comprising:

(a) a first interface which communicates with external analog electrical signals, said first interface creating analog signals, said analog signals being communicated to an analog bus;

(b) a second interface which communicates with external digital electrical signals, said second interface creating digital signals, said digital signals being communicated to a digital bus;

(c) a plurality of analog crosspoint switches, each of said analog crosspoint switches having a first input side, a first output side, and a first control input, said first input side being communicated from said analog bus, said first output side being communicated to said analog bus, said first control input being communicated from a control bus;

(d) a plurality of digital crosspoint switches, each of said digital crosspoint switches having a second input side, a second output side, and a second control input, said second input side being communicated from said digital bus, said second output side being communicated to said digital bus, said second control input being communicated from said control bus;

(e) the control bus, said control bus controlling communications with said external analog electrical signals by use of said first interface and said analog bus;

(f) a processing unit which centrally controls the switching of said analog signals by controlling a trigger bus, said trigger bus communicating with a trigger selection controller, said trigger selection controller having a plurality of outputs which are communicated to at least one trigger line, said at least one trigger line controlling the switching of said analog signals by communicating with the first control input of an individual analog crosspoint switch of said plurality of analog crosspoint switches;

(g) said control bus additionally controlling communications with said external digital electrical signals by use of said second interface and said digital bus;

(h) said processing unit additionally centrally controlling the switching of said digital signals by controlling said trigger bus, said trigger bus communicating with said trigger selection controller, said at least one trigger line controlling the switching of said digital signals by communicating with the second control input of an individual digital crosspoint switch of said plurality of digital crosspoint switches;

(i) a trigger signal generating circuit that receives signals from one or more of said analog bus, digital bus, control bus, and trigger bus, said trigger signal generating circuit outputting multiple, substantially simultaneous trigger signals upon said trigger bus;

(j) an information transmitter control circuit which transmits control information and data information to external high-speed multi-media switching systems; and (k) an information receiver control circuit which receives control information and data information from external high-speed multi-media switching systems.

28. A multi-media high-speed switching assembly as recited in claim 27, wherein said high-speed multi-media switching systems each employ said processing unit to utilize said received control information and received data information in determining the controlling of the switching of said analog signals and said digital signals.

29. A multi-media high-speed switching assembly as recited in claim 27, wherein said high-speed multi-media switching systems further comprise:

(a) the first of said multi-media switching systems includes a plurality of digital input ports which are in communication with a first plurality of incoming data stream signals;

(b) said first multi-media switching system includes an information manipulating circuit which combines said first plurality of incoming data stream signals into a single second data stream signal;

(c) said first multi-media switching system includes a digital output port which transmits said second data stream signal to the second of said multi-media switching systems;

(d) said second multi-media switching system includes a digital input port which is in communication with said second data stream signal;

(e) said second multi-media switching system includes a time slot switching module which divides said second data stream signal into a third plurality of data stream signals which are identical to said first plurality of incoming data stream signals; and.

(f) said second multi-media switching system includes a plurality of digital output ports which transmit said third plurality of data stream signals.

30. A multi-media high-speed assembly as recited in claim 27, wherein said high-speed multi-media switching systems further comprise:

(a) the first of said multi-media switching systems includes a plurality of analog input ports which are in communication with a first plurality of incoming data stream signals;

(b) said first multi-media switching system includes a plurality of analog-to-digital convertors which convert the first plurality of incoming data stream signals from analog form into digital form, thus creating a second plurality of digital data stream signals;

(c) said first multi-media switching system includes a plurality of time slot switching modules which divide said second plurality of digital data stream signals and recombine said second plurality of digital data stream signals into a single third data stream signal;

(d) said first multi-media switching system includes a digital output port which transmits said third data stream signal to the second of said multi-media switching systems;

(e) said second multi-media switching system includes a digital input port which is in communication with said third data stream signal;

(f) said second multi-media switching system includes a time slot switching module which divides said third data stream signal into a fourth plurality of data stream signals which are identical to said second plurality of digital data stream signals;

(g) said second multi-media switching system includes a plurality of digital to analog converters which convert the fourth plurality of data stream signals from digital form into analog form, thus creating a fifth plurality of analog data stream signals which are identical to said first plurality of incoming data stream signals; and (h) said second multi-media switching system includes a plurality of analog output ports which transmit said fifth plurality of data stream signals.

31. A high-speed multi-media switching system that switches both analog signals and digital signals, said system comprising:

(a) a plurality of analog input devices;

(b) a plurality of analog output devices;

(c) a first interface which controls said analog input devices, said first interface also communicating analog signals generated by said analog input devices to an analog bus;

(d) a second interface which controls said analog output devices, said second interface also communicating analog signals from said analog bus to said analog output devices;

(e) a processing unit which centrally controls said first and second interfaces via a control bus;

(f) a third interface which controls digital input devices and communicates with a digital bus;

(g) a fourth interface which controls digital output devices and communicates with said digital bus;

(h) said processing unit additionally centrally controlling said third and fourth interfaces via said control bus;

(i) a plurality of analog switches, each of said analog switches having an input side, an output side, and a control input, said analog switches communicating with said analog input devices and with said analog output devices via said analog bus and said control bus;

(j) a trigger bus, said trigger bus communicating with a trigger selection controller, said trigger selection controller having a plurality of outputs which are communicated to at least one trigger line, said at least one trigger line controlling the switching of said analog signals by communicating with the control input of an individual analog switch of said plurality of analog switches, thereby controlling the analog switch's operation, said processing unit controlling said control bus, trigger bus, and trigger selection controller by determining under what conditions the outputs of the trigger selection controller will change state, thereby controlling which signal lines of said analog bus are switched, via said analog switches, to which signal lines of said analog bus and under what triggering conditions; and (k) a trigger signal generating circuit that receives signals from one or more of said analog bus, digital bus, control bus, and trigger bus, said trigger signal generating circuit outputting multiple, substantially simultaneous trigger signals upon said trigger bus.

32. A high-speed multi-media switching system that switches both analog signals and digital signals, said system comprising:

(a) a plurality of said digital input devices;

(b) a plurality of said digital output devices;

(c) a first interface which controls analog input devices and communicates with an analog bus;

(d) a second interface which controls analog output devices and communicates with said analog bus;

(e) a processing unit which centrally controls said first and second interfaces via a control bus;

(f) a third interface which controls said digital input devices, said third interface also communicating digital signals generated by said digital input devices to a digital bus;

(g) a fourth interface which controls said digital output devices, said fourth interface also communicating digital signals from said digital bus to said digital output devices;

(h) said processing unit additionally centrally controlling said third and fourth interfaces via said control bus;

(i) a plurality of digital switches, each of said digital switches having an input side, an output side, and a control input, said digital switches communicating with said digital input devices and with said digital output devices via said digital bus and said control bus;

(j) a trigger bus, said trigger bus communicating with a trigger selection controller, said trigger selection controller having a plurality of outputs which are communicated to at least one trigger line, said at least one trigger line controlling the switching of said digital signals by communicating with the control input of an individual digital switch of said plurality of digital switches, thereby controlling the digital switch's operation, said processing unit controlling said control bus, trigger bus, and trigger selection controller by determining under what conditions the outputs of the trigger selection controller will change state, thereby controlling which signal lines of said digital bus are switched, via said digital switches, to which signal lines of said digital bus and under what triggering conditions; and (k) a trigger Signal generating circuit that receives signals from one or more of said analog bus digital bus, control bus, and trigger bus, said trigger signal generating circuit outputting multiple substantially simultaneous trigger signals upon said trigger bus.

33. A high-speed multi-media switching system that switches both analog signal and digital signals, said system comprising:

(a) a first interface which communicates with external analog electrical signals, said first interface creating analog signals, said analog signals being communicated to an analog bus;

(b) a second interface which communicates with external digital electrical signals, said second interface creating digital signals, said digital signals being communicated to a digital bus;

(c) a plurality of analog crosspoint switches, each of said analog crosspoint switches having a first input side, a first output side, and a first control input, said first input side being communicated from said analog bus, said first output side being communicated to said analog bus, said first control input being communicated from a control bus;

(d) a plurality of digital crosspoint switches, each of said digital crosspoint switches having a second input side, a second output side, and a second control input, said second input side being communicated from said digital bus, said second output side being communicated to said digital bus, said second control input being communicated from said control bus; and (e) a central control system, comprising:

(i) the control bus, said control bus controlling communications with said external analog electrical signals by use of said first interface and said analog bus;

(ii) a parallel trigger bus, said trigger bus communicating with a trigger selection controller, said trigger selection controller having a plurality of outputs which are communicated to at least one trigger line, said at least one trigger line controlling the switching of said analog signals by communicating with the first control input of an individual analog crosspoint switch of said plurality of analog crosspoint switches, thereby controlling the analog crosspoint switch's operation;

(iii) said control bus additionally controlling communications with said external digital electrical signals by use of said second interface and said digital bus;

(iv) said parallel trigger bus additionally communicating with said trigger selection controller, said at least one trigger line controlling the switching of said digital signals by communicating with the second control input of an individual digital crosspoint switch of said plurality of digital crosspoint switches, thereby controlling the digital crosspoint switch's operation;

(v) a trigger signal generating circuit that receives signals from one or more of said analog bus, digital bus, control bus, and parallel trigger bus, said trigger signal generating circuit outputting at least one parallel trigger signal upon said parallel trigger bus; and (vi) a processing unit which controls said control bus, parallel trigger bus, and trigger selection controller by determining under what conditions the outputs of the trigger selection controller will change state, thereby controlling which signal lines of said analog bus are switched, via said analog crosspoint switches, to which signal lines of said analog bus and under what triggering conditions, and controlling which signal lines of said digital bus are switched, via said digital crosspoint switches, to which signal lines of said digital bus and under what triggering conditions.

34. The high-speed multi-media switching system as recited in claim 33, wherein said trigger signal generating circuit is configured to output a change of state of said at least one parallel trigger signal substantially simultaneously with a state change of said received signals from one or more of said analog bus, digital bus, control bus, and parallel trigger bus.

35. The high-speed multi-media switching system as recited in claim 33, wherein said trigger selection controller comprises a plurality of trigger selection multiplexors and a plurality of trigger address registers which operate according to the following sequence of operations:

(a) said analog signals that are to be switched are in communication with the first input side of said plurality of analog crosspoint switches;

(b) said trigger selection controller stacks up a plurality of preset commands which, upon the occurrence of each of a plurality of predetermined events cause, in the proper sequence, at least one predetermined analog crosspoint switch operates of said plurality of analog crosspoint switches; and (c) upon the occurrence of one of said plurality of predetermined events, said at least one analog crosspoint switch operates to connect the first input side of the analog switch to the first output side of the same analog switch, thus allowing the analog signal to travel through the analog switch.

36. The high-speed multi-media switching system as recited in claim 33, wherein said trigger selection controller comprises a plurality of trigger selection multiplexors and a plurality of trigger address registers which operate according to the following sequence of operations:

(a) said digital signals that are to be switched are in communication with the second input side of said plurality of digital crosspoint switches;

(b) said trigger selection controller stacks up a plurality of preset commands which, upon the occurrence of each of a plurality of predetermined events cause, in the proper sequence, at least one predetermined digital crosspoint switch operates of said plurality of digital crosspoint switches; and (c) upon the occurrence of one of said plurality of predetermined events, said at least one digital crosspoint switch operates to connect the second input side of the digital switch to the second output side of the same digital switch, thus allowing the digital signal to travel through the digital switch.

37. The high-speed multi-media switching system as recited in claim 33, further comprising a time slot switching module which comprises a disassembly circuit that divides an incoming data stream into individual segments, computer memory, a memory interface circuit which stores said segments in said computer memory, and a reassembly circuit that assembles said segments into new data streams for output.

38. A multi-media high-speed switching assembly, comprising a plurality of high-speed multi-media switching systems having the capability to communicate control information and data information to each other, said switching systems each comprising:

(a) a first interface which communicates with external analog electrical signals, said first interface creating analog signals, said analog signals being communicated to an analog bus;

(b) a second interface which communicates with external digital electrical signals, said second interface creating digital signals, said digital signals being communicated to a digital bus;

(c) a plurality of analog crosspoint switches, each of said analog crosspoint switches having a first input side, a first output side, and a first control input, said first input side being communicated from said analog bus, said first output side being communicated to said analog bus, said first control input being communicated from a control bus;

(d) a plurality of digital crosspoint switches, each of said digital crosspoint switches having a second input side, a second output side, and a second control input, said second input side being communicated from said digital bus, said second output side being communicated to said digital bus, said second control input being communicated from said control bus;

(e) the control bus, said control bus controlling communications with said external analog electrical signals by use of said first interface and said analog bus;

(f) a processing unit which centrally controls the switching of said analog signals by controlling a parallel trigger bus, said trigger bus communicating with a trigger selection controller, said trigger selection controller having a plurality of outputs which are communicated to at least one trigger line, said at least one trigger line controlling the switching of said analog signals by communicating with the first control input of an individual analog crosspoint switch of said plurality of analog crosspoint switches;

(g) said control bus additionally controlling communications with said external digital electrical signals by use of said second interface and said digital bus;

(h) said processing unit additionally centrally controlling the switching of said digital signals by controlling said parallel trigger bus, said trigger bus communicating with said trigger selection controller, said at least one trigger line controlling the switching of said digital signals by communicating with the second control input of an individual digital crosspoint switch of said plurality of digital crosspoint switches;

(i) a trigger signal generating circuit that receives signals from one or more of said analog bus, digital bus, control bus, and parallel trigger bus, said trigger signal generating circuit outputting at least one parallel trigger signal upon said parallel trigger bus; and (j) an information transmitter control circuit which transmits control information and data information to external high-speed multi-media switching systems; and (k) an information receiver control circuit which receives control information and data information from external high-speed multi-media switching systems.

39. The multi-media high-speed switching assembly as recited in claim 38, wherein said high-speed multi-media switching systems each employ said processing unit to utilize said received control information and received data information in determining the controlling of the switching of said analog signals and said digital signals.

40. The multi-media high-speed switching assembly as recited in claim 38, wherein said high-speed multi-media switching systems further comprise:

(a) the first of said multi-media switching systems includes a plurality of digital input ports which are in communication with a first plurality of incoming data stream signals;

(b) said first multi-media switching system includes an information manipulating circuit which combines said first plurality of incoming data stream signals into a single second data stream signal;

(c) said first multi-media switching system includes a digital output port which transmits said second data stream signal to the second of said multi-media switching systems;

(d) said second multi-media switching system includes a digital input port which is in communication with said second data stream signal;

(e) said second multi-media switching system includes a time slot switching module which divides said second data stream signal into a third plurality of data stream signals which are identical to said first plurality of incoming data stream signals; and (f) said second multi-media switching system includes a plurality of digital output ports which transmit said third plurality of data stream signals.

41. A high-speed multi-media switching system that switches both analog signals and digital signals, said system comprising:

(a) a plurality of analog input devices;

(b) a plurality of analog output devices;

(c) a first interface which controls said analog input devices, said first interface also communicating analog signals generated by said analog input devices to an analog bus;

(d) a second interface which controls said analog output devices, said second interface also communicating analog signals from said analog bus to said analog output devices;

(e) a processing unit which centrally controls said first and second interfaces via a control bus;

(f) a third interface which controls digital input devices and communicates with a digital bus;

(g) a fourth interface which controls digital output devices and communicates with said digital bus;

(h) said processing unit additionally centrally controlling said third and fourth interfaces via said control bus;

(i) a plurality of analog switches, each of said analog switches having an input side, an output side, and a control input, said analog switches communicating with said analog input devices and with said analog output devices via said analog bus and said control bus;

(j) a parallel trigger bus, said trigger bus communicating with a trigger selection controller, said trigger selection controller having a plurality of outputs which are communicated to at least one trigger line, said at least one trigger line controlling the switching of said analog signals by communicating with the control input of an individual analog switch of said plurality of analog switches, thereby controlling the analog switch's operation, said processing unit controlling said control bus, parallel trigger bus, and trigger selection controller by determining under what conditions the outputs of the trigger selection controller will change state, thereby controlling which signal lines of said analog bus are switched, via said analog switches, to which signal lines of said analog bus and under what triggering conditions; and (k) a trigger signal generating circuit that receives signals from one or more of said analog bus, digital bus, control bus, and parallel trigger bus, said trigger signal generating circuit outputting at least one parallel trigger signal upon said parallel trigger bus.

42. A high-speed multi-media switching system that switches both analog signals and digital signals, said system comprising:

(a) a plurality of said digital input devices;

(b) a plurality of said digital output devices;

(c) a first interface which controls analog input devices and communicates with an analog bus;

(d) a second interface which controls analog output devices and communicates with said analog bus;

(e) a processing unit which centrally controls said first and second interfaces via a control bus;

(f) a third interface which controls said digital input devices, said third interface also communicating digital signals generated by said digital input devices to a digital bus;

(g) a fourth interface which controls said digital output devices, said fourth interface also communicating digital signals from said digital bus to said digital output devices;

(h) said processing unit additionally centrally controlling said third and fourth interfaces via said control bus;

(i) a plurality of digital switches, each of said digital switches having an input side, an output side, and a control input, said digital switches communicating with said digital input devices and with said digital output devices via said digital bus and said control bus;

(j) a trigger bus, said trigger bus communicating with a trigger selection controller, said trigger selection controller having a plurality of outputs which are communicated to at least one trigger line, said at least one trigger line controlling the switching of said digital signals by communicating with the control input of an individual digital switch of said plurality of digital switches, thereby controlling the digital switch's operation, said processing unit controlling said control bus, trigger bus, and trigger selection controller by determining under what conditions the outputs of the trigger selection controller will change state, thereby controlling which signal lines of said digital bus are switched, via said digital switches, to which signal lines of said digital bus and under what triggering conditions; and (k) a trigger signal generating circuit that receives signals from one or more of said analog bus, digital bus, control bus, and parallel trigger bus, said trigger signal generating circuit outputting at least one parallel trigger signal upon said parallel trigger bus.

43. A high-speed multi-media switching system that switches both analog signal and digital signals, said system comprising:

(a) a first interface which communicates with external analog electrical signals, said first interface creating analog signals, said analog signals being communicated to an analog bus;

(b) a second interface which communicates with external digital electrical signals, said second interface creating digital signals, said digital signals being communicated to a digital bus;

(c) a plurality of analog crosspoint switches, each of said analog crosspoint switches having a first input side, a first output side, and a first control input, said first input side being communicated from said analog bus, said first output side being communicated to said analog bus, said first control input being communicated from a control bus;

(d) a plurality of digital crosspoint switches, each of said digital crosspoint switches having a second input side, a second output side, and a second control input, said second input side being communicated from said digital bus, said second output side being communicated to said digital bus, said second control input being communicated from said control bus; and (e) a central control system, comprising:

(i) the control bus, said control bus controlling communications with said external analog electrical signals by use of said first interface and said analog bus;

(ii) a trigger bus, said trigger bus communicating with a trigger selection controller, said trigger selection controller having a plurality of outputs which are communicated to at least one trigger line, said at least one trigger line controlling the switching of said analog signals by communicating with the first control input of an individual analog crosspoint switch of said plurality of analog crosspoint switches, thereby controlling the analog crosspoint switch's operation;

(iii) said control bus additionally controlling communications with said external digital electrical signals by use of said second interface and said digital bus;

(iv) said trigger bus additionally communicating with said trigger selection controller, said at least one trigger line controlling the switching of said digital signals by communicating with the second control input of an individual digital crosspoint switch of said plurality of digital crosspoint switches, thereby controlling the digital crosspoint switch's operation;

(v) a processing unit which controls said control bus, trigger bus, and trigger selection controller by determining under what conditions the outputs of the trigger selection controller will change state, thereby controlling which signal lines of said analog bus are switched, via said analog crosspoint switches, to which signal lines of said analog bus and under what triggering conditions, and controlling which signal lines of said digital bus are switched, via said digital crosspoint switches, to which signal lines of said digital bus and under what triggering conditions; and (vi) a time slot switching module comprising a disassembly circuit that divides an incoming data stream into individual segments, computer memory, a memory interface circuit which stores said segments in said computer memory, and a reassembly circuit that assembles said segments into new data streams for output without altering the data content of said segments.

44. The high-speed multi-media switching system as recited in claim 43, wherein said trigger bus comprises a parallel bus structure.

* * * * *

UNITED STATES PATENT AND TRADEMARK OFFICE

CERTIFICATE OF CORRECTION

PATENT NO. : 5,420,856

DATED : May 30, 1995

INVENTOR(S) : Robert Q. Kerns

It is certified that error appears in the above-indentified patent and that said Letters Patent is hereby corrected as shown below:

Column 33, line 28, (claim 32), "Signal", should read --signal--

Column 33, line 29, (claim 32), insert --,-- after "bus"

Column 33, line 31, (claim 32), insert --,-- after "multiple"

Signed and Sealed this

Twentieth Day of February, 1996

Attest:

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : 5,420,856

DATED : May 30, 1995

INVENTOR(S) : Robert Q. Kerns

It is certified that error appears in the above-indentified patent and that said Letters Patent is hereby corrected as shown below:

Column 27, line 36, (claim 8), insert --control-- before --interface--.

Signed and Sealed this

Twenty-first Day of May, 1996

Attest:

BRUCE LEHMAN

*Attesting Officer* — *Commissioner of Patents and Trademarks*